US012552238B2

(12) United States Patent
Ripley et al.

(10) Patent No.: US 12,552,238 B2
(45) Date of Patent: Feb. 17, 2026

(54) POWERTRAIN FOR A UTILITY VEHICLE

(71) Applicant: Polaris Industries Inc., Medina, MN (US)

(72) Inventors: Anthony J. Ripley, Ham Lake, MN (US); Andrew C. Schleif, Stacy, MN (US); Alex R. Scheuerell, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/400,916

(22) Filed: Dec. 29, 2023

(65) Prior Publication Data

US 2024/0208321 A1 Jun. 27, 2024

Related U.S. Application Data

(63) Continuation of application No. 17/147,937, filed on Jan. 13, 2021.

(60) Provisional application No. 62/961,442, filed on Jan. 15, 2020.

(51) Int. Cl.
*B60K 5/12* (2006.01)
*B62D 21/10* (2006.01)
*B62D 21/18* (2006.01)

(52) U.S. Cl.
CPC ............ *B60K 5/1208* (2013.01); *B62D 21/10* (2013.01); *B62D 21/183* (2013.01); *B60Y 2200/20* (2013.01)

(58) Field of Classification Search
CPC .... B60K 5/1208; B60K 17/354; B60K 17/02; B60K 17/08; B60K 17/165; B60K 17/22; B60K 17/344; B60K 5/02; B60K 2005/003; B60K 17/06; B60K 17/04; B60K 17/16; B60K 17/28; B62D 21/10; B62D 21/183; B62D 23/005; B60Y 2200/20
See application file for complete search history.

(56) References Cited

U.S. PATENT DOCUMENTS

| 5,788,594 A | 8/1998 | Lee |
| D636,295 S | 4/2011 | Eck et al. |
| D650,311 S | 12/2011 | Bracy |

(Continued)

FOREIGN PATENT DOCUMENTS

| CN | 1320538 A | 11/2001 |
| CN | 101039815 A | 9/2007 |

(Continued)

OTHER PUBLICATIONS

Haitao, Z., et al., "A brief talk about oneself Dynamic speed change device development A brief history", No. 04, Feb. 5, 2008, pp. 1-23. (English Translation Not Available).

(Continued)

*Primary Examiner* — Long T Tran
*Assistant Examiner* — Charles J Brauch
(74) *Attorney, Agent, or Firm* — Merchant & Gould P.C.

(57) ABSTRACT

An off-road vehicle includes a powertrain assembly having an engine and a steel belt continuously variable transmission. Portions of the powertrain assembly are supported at a rear portion of the vehicle and are positioned relative to other components of the vehicle also supported at the rear portion of the vehicle. The vehicle also is configured for various operating modes.

20 Claims, 24 Drawing Sheets

(56) References Cited

U.S. PATENT DOCUMENTS

| | | |
|---|---|---|
| 8,328,235 B2 | 12/2012 | Schneider et al. |
| 8,613,335 B2 | 12/2013 | Deckard et al. |
| 8,640,814 B2 | 2/2014 | Deckard et al. |
| D703,102 S | 4/2014 | Eck et al. |
| 8,746,719 B2 | 6/2014 | Safranski et al. |
| D711,778 S | 8/2014 | Chun et al. |
| D722,538 S | 2/2015 | Song et al. |
| 8,973,693 B2 | 3/2015 | Kinsman et al. |
| 8,997,908 B2 | 4/2015 | Kinsman et al. |
| 9,381,803 B2 | 7/2016 | Galsworthy et al. |
| 9,421,860 B2 | 8/2016 | Schuhmacher et al. |
| 9,566,858 B2 | 2/2017 | Hicke et al. |
| 9,650,078 B2 | 5/2017 | Kinsman et al. |
| 9,713,976 B2 | 7/2017 | Miller et al. |
| 9,718,351 B2 | 8/2017 | Ripley et al. |
| 9,725,023 B2 | 8/2017 | Miller et al. |
| 9,776,481 B2 | 10/2017 | Deckard et al. |
| 9,908,577 B2 | 3/2018 | Novak et al. |
| 10,017,090 B2 | 7/2018 | Franker et al. |
| 10,124,709 B2 | 11/2018 | Bohnsack et al. |
| D835,545 S | 12/2018 | Hanten et al. |
| 10,183,605 B2 | 1/2019 | Weber et al. |
| 10,246,153 B2 | 4/2019 | Deckard et al. |
| 10,300,786 B2 | 5/2019 | Nugteren et al. |
| D852,674 S | 7/2019 | Wilcox et al. |
| 10,369,861 B2 | 8/2019 | Deckard et al. |
| 10,479,422 B2 | 11/2019 | Hollman et al. |
| 2002/0003058 A1 | 1/2002 | Hori et al. |
| 2002/0139597 A1 | 10/2002 | Kinoshita et al. |
| 2004/0060755 A1 | 4/2004 | Uranaka et al. |
| 2005/0224262 A1 | 10/2005 | Ima et al. |
| 2006/0084548 A1 | 4/2006 | Abiru et al. |
| 2008/0179860 A1 | 7/2008 | Bell |
| 2009/0241702 A1 | 10/2009 | Osuga et al. |
| 2010/0262347 A1 | 10/2010 | Murota et al. |
| 2011/0301825 A1 | 12/2011 | Grajkowski et al. |
| 2014/0067215 A1* | 3/2014 | Wetterlund ............. G06F 17/00 701/69 |
| 2015/0343901 A1 | 12/2015 | Brooks et al. |
| 2016/0288637 A1 | 10/2016 | Yamamoto et al. |
| 2016/0290437 A1 | 10/2016 | Serizawa et al. |
| 2017/0217309 A1 | 8/2017 | Hashimoto |
| 2017/0225563 A1 | 8/2017 | Hwang |
| 2018/0178677 A1 | 6/2018 | Swain et al. |
| 2019/0093745 A1 | 3/2019 | Younggren et al. |
| 2019/0210457 A1 | 7/2019 | Galsworthy et al. |
| 2019/0210668 A1 | 7/2019 | Endrizzi et al. |
| 2020/0010125 A1 | 1/2020 | Peterson et al. |
| 2021/0024007 A1 | 1/2021 | Fredrickson et al. |
| 2021/0213822 A1 | 7/2021 | Ripley et al. |

FOREIGN PATENT DOCUMENTS

| | | |
|---|---|---|
| CN | 105270170 A | 1/2016 |
| CN | 107000572 A | 8/2017 |
| CN | 107148365 A | 9/2017 |
| JP | 2000-062486 A | 2/2000 |
| WO | 2013/166310 A1 | 11/2013 |
| WO | 2016/099770 A2 | 6/2016 |
| WO | 2016/104362 A1 | 6/2016 |
| WO | 2016/186942 A1 | 11/2016 |
| WO | 2018/118176 A1 | 6/2018 |
| WO | 2018/118508 A2 | 6/2018 |
| WO | 2019/140026 A1 | 7/2019 |
| WO | 2020/223379 A1 | 11/2020 |

OTHER PUBLICATIONS

Joshua Martelli, We Review Honda's Two New 6-Speed DCT Multi-Sport UTV's, UTVUnderground.com, dated Aug. 27, 2019; 34 pages.

* cited by examiner

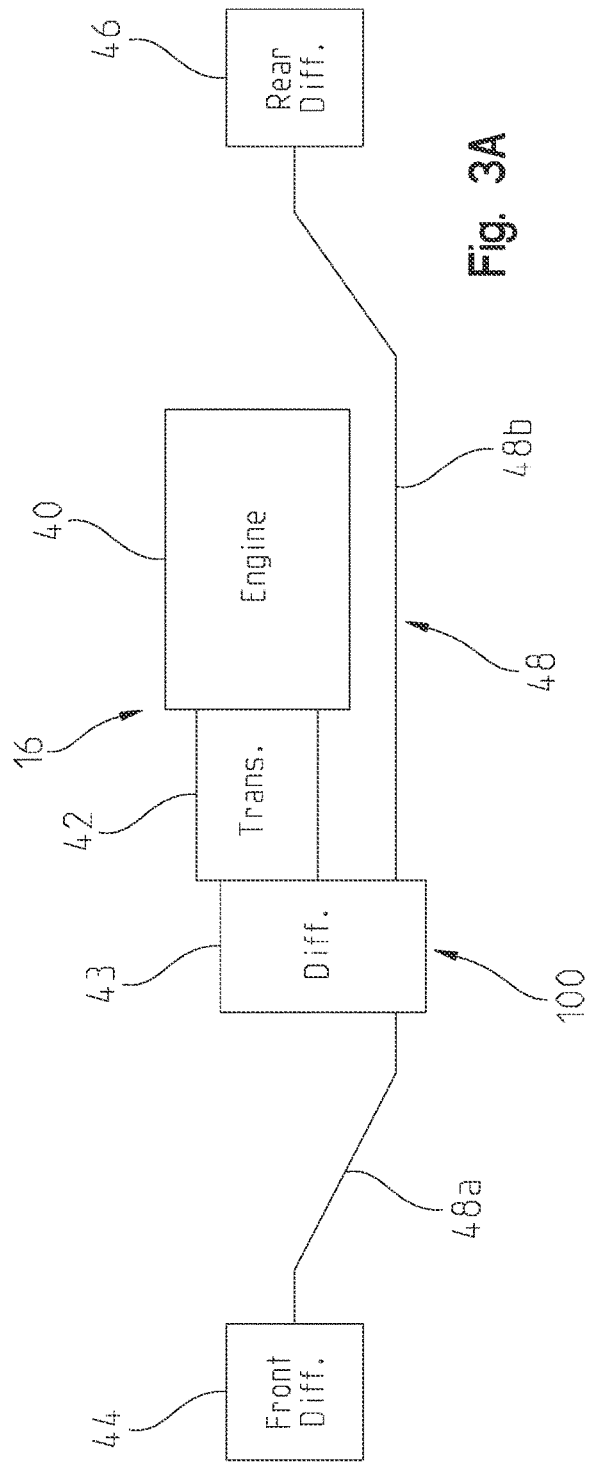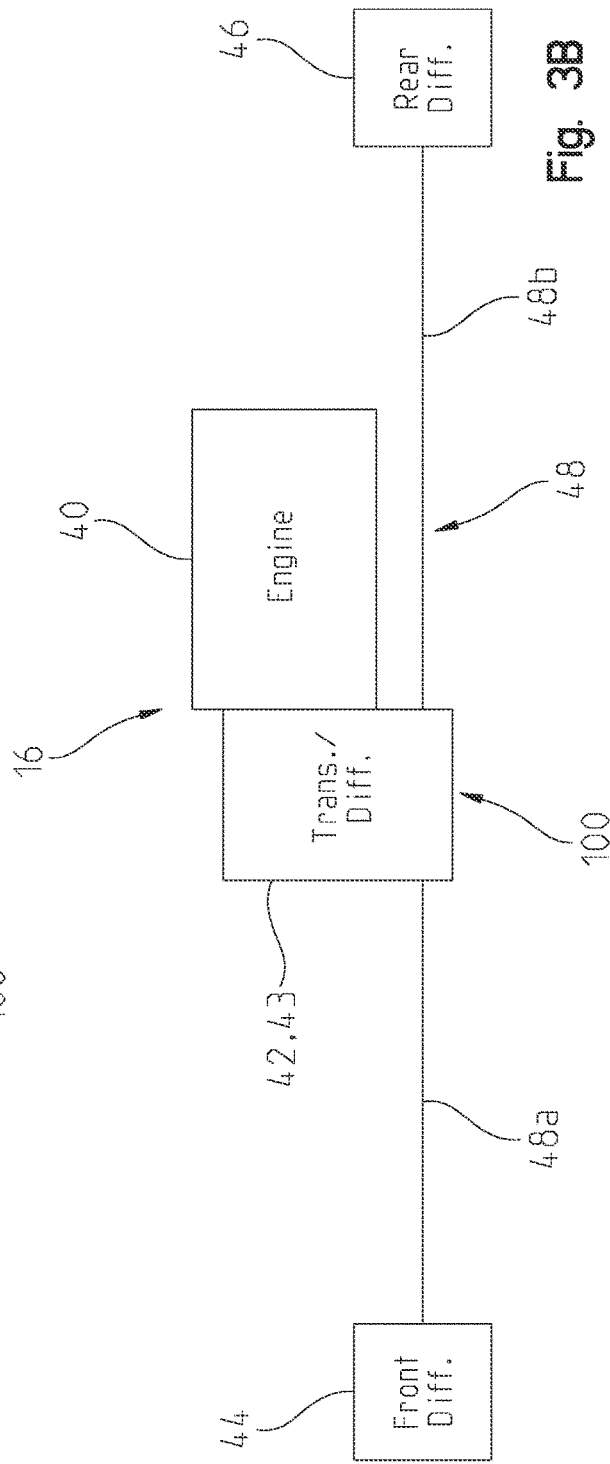

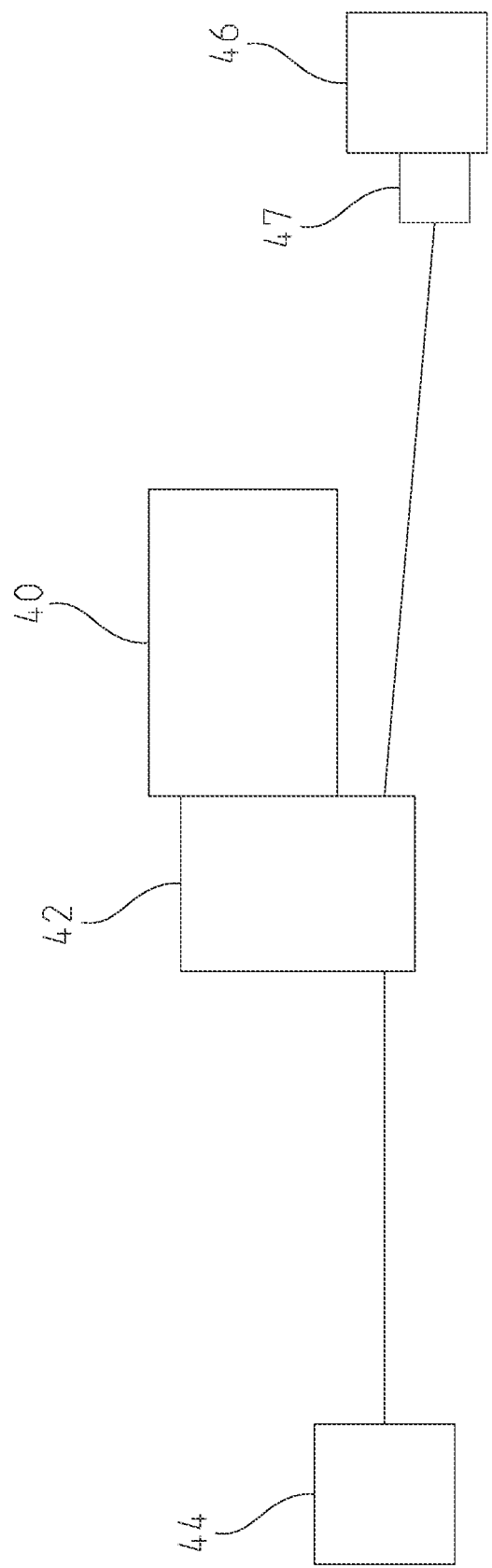

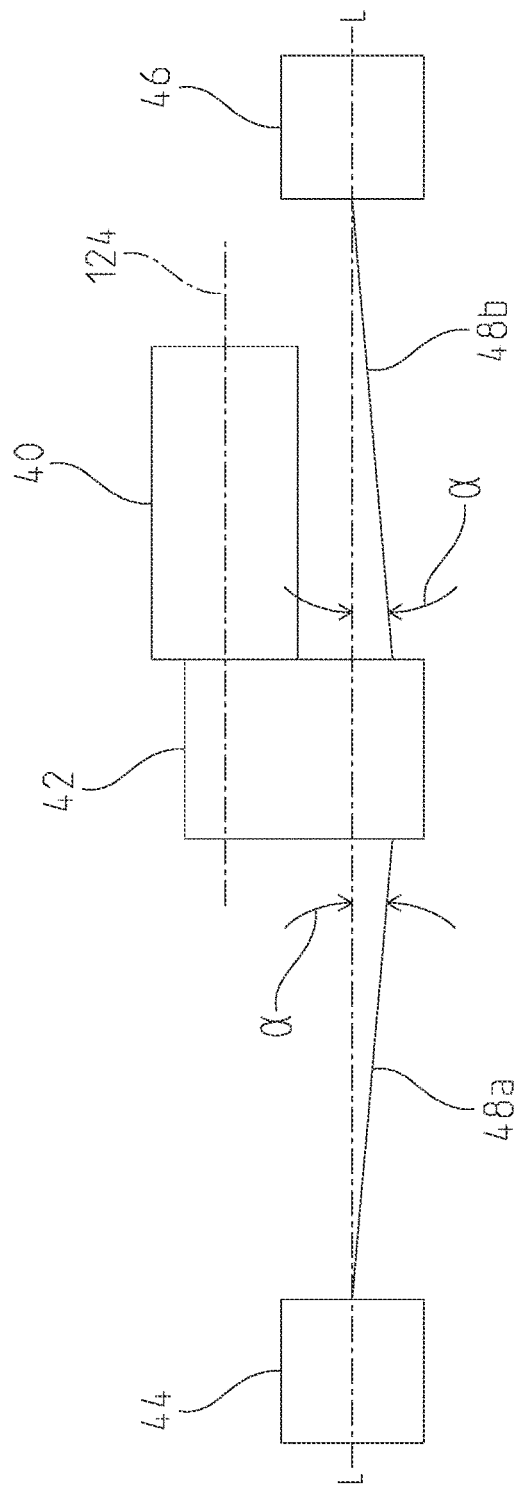
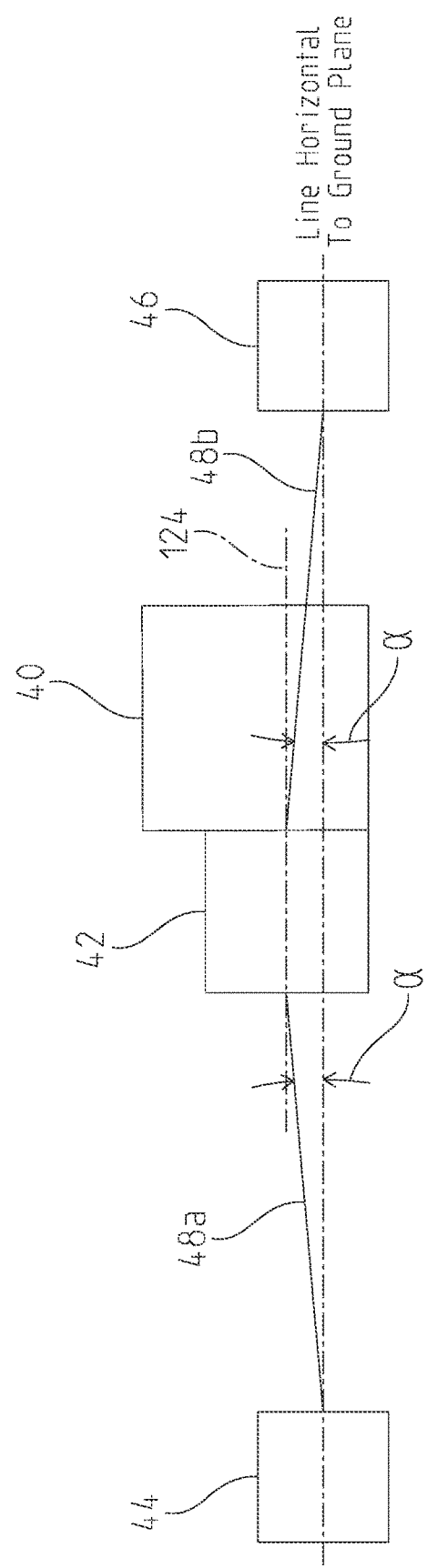

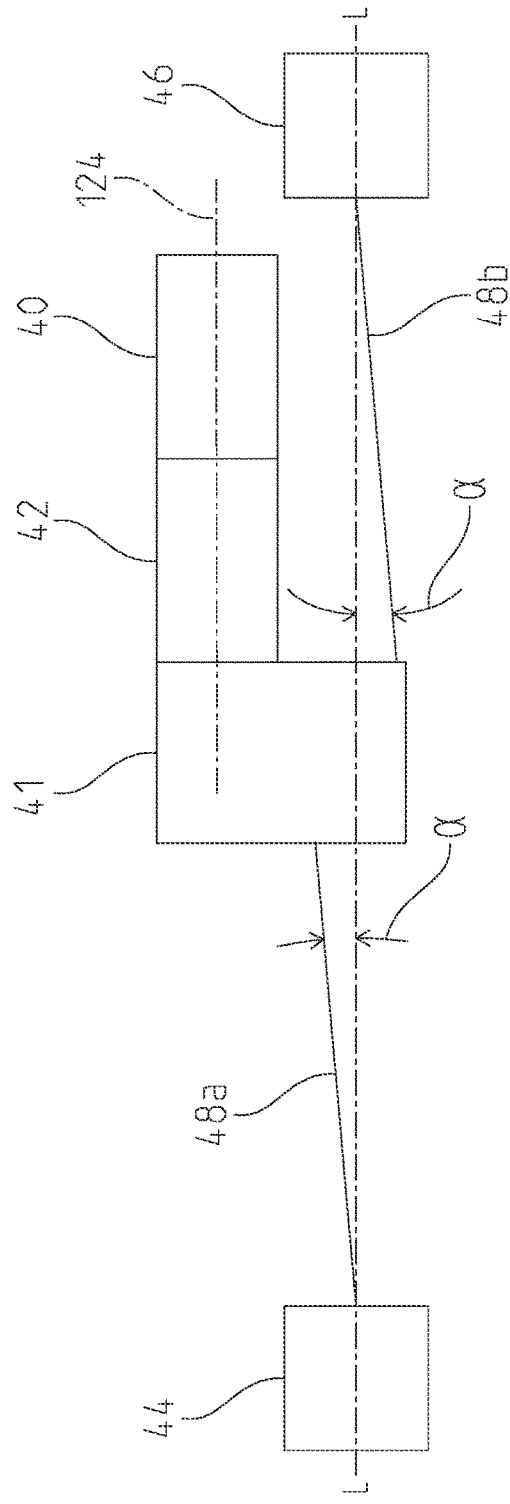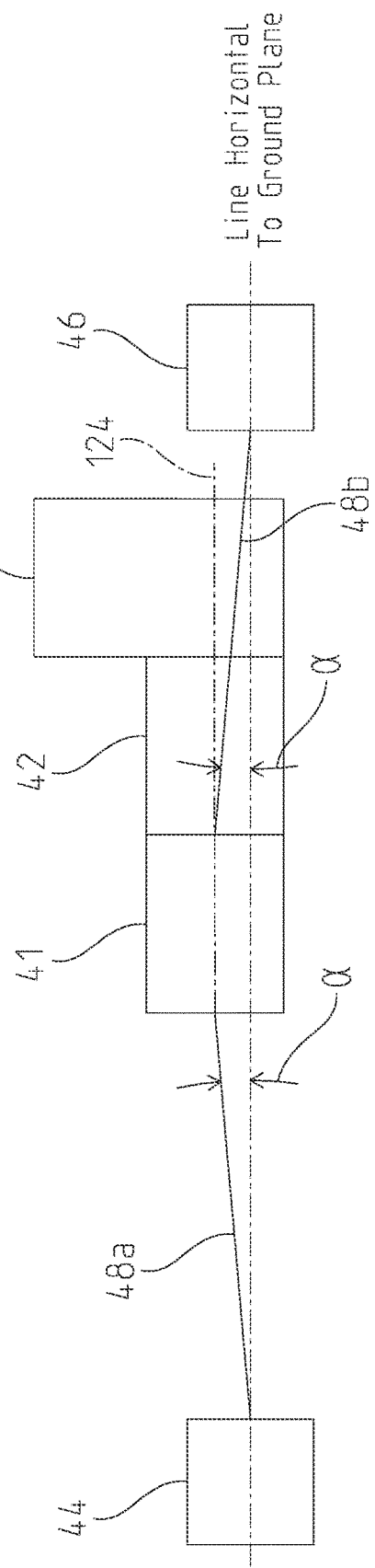

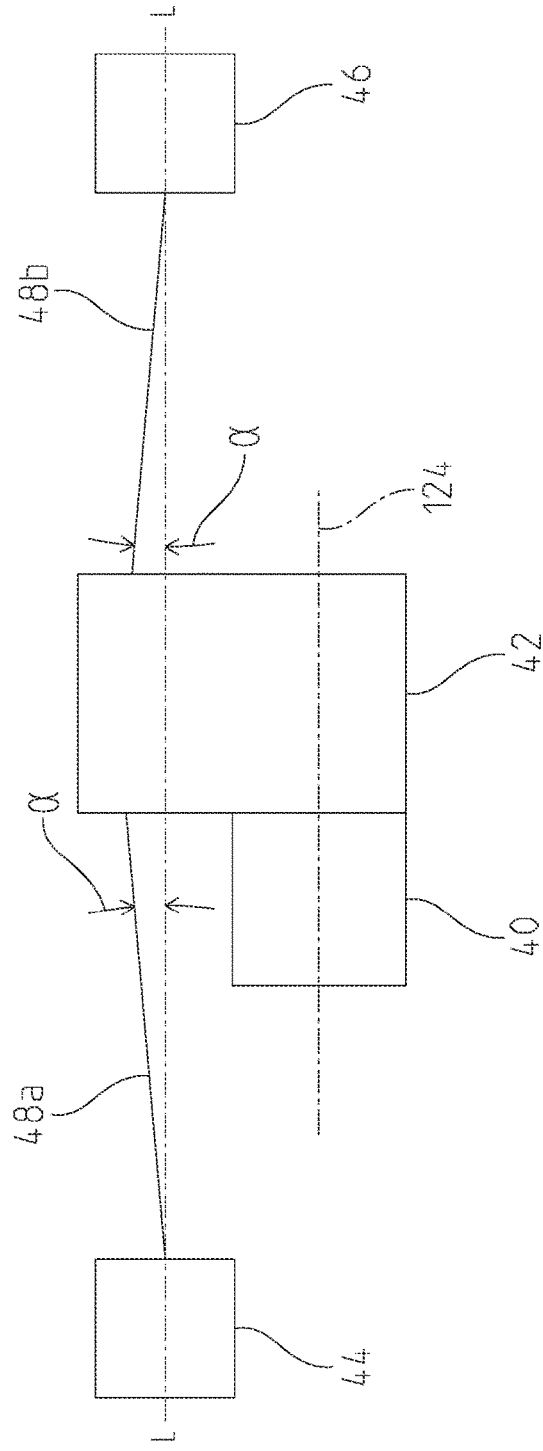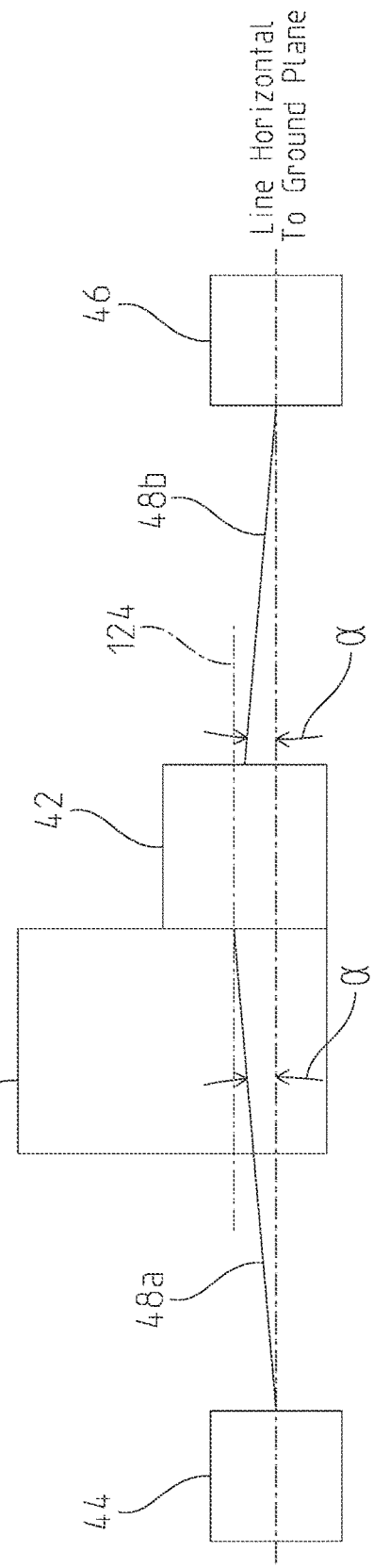

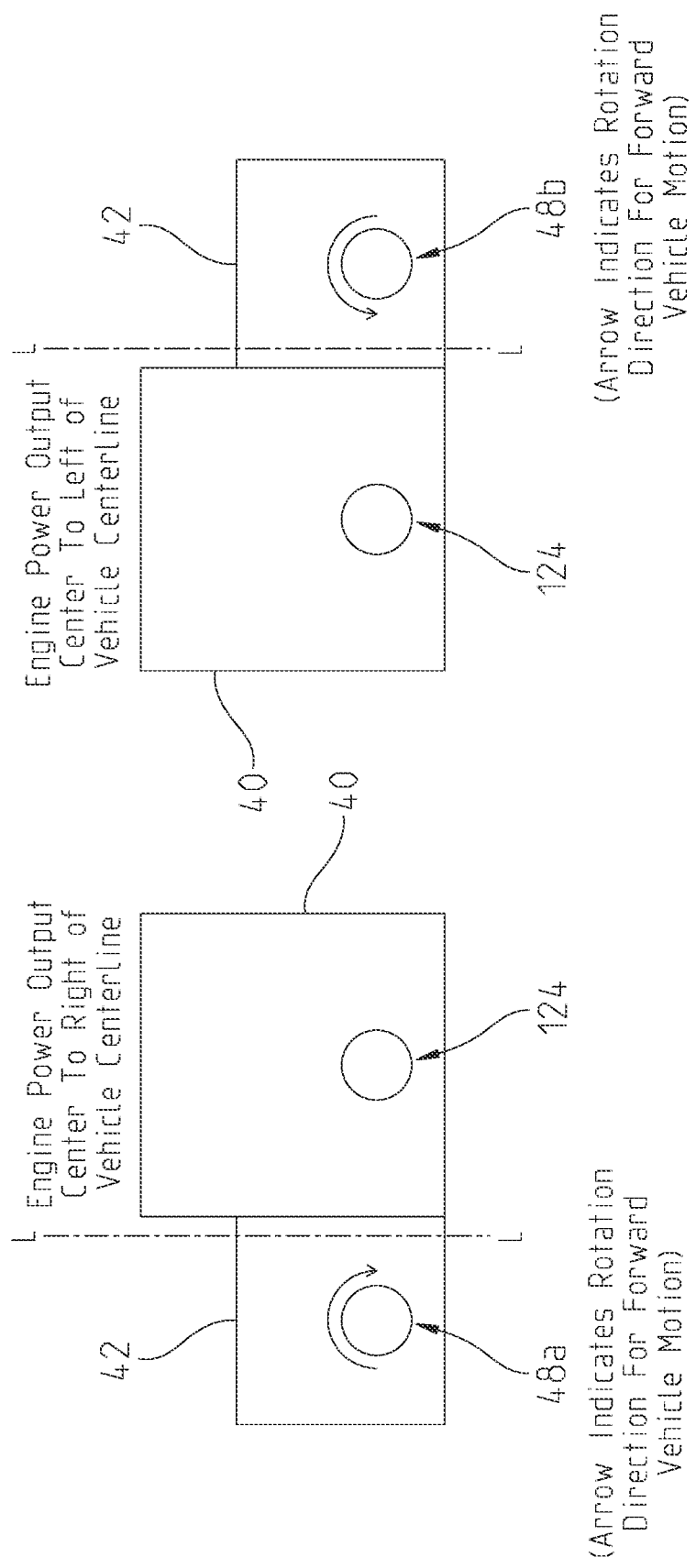

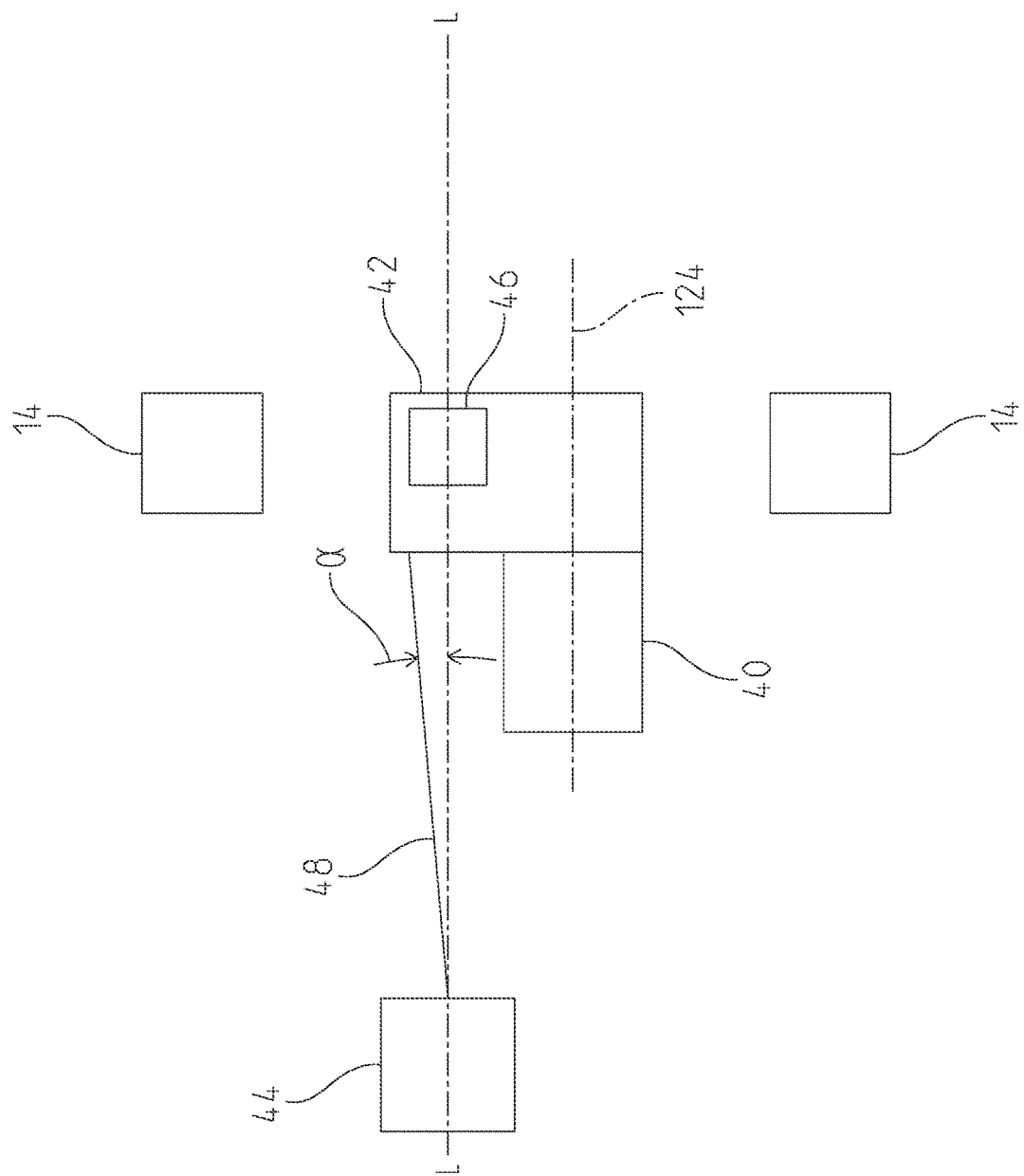

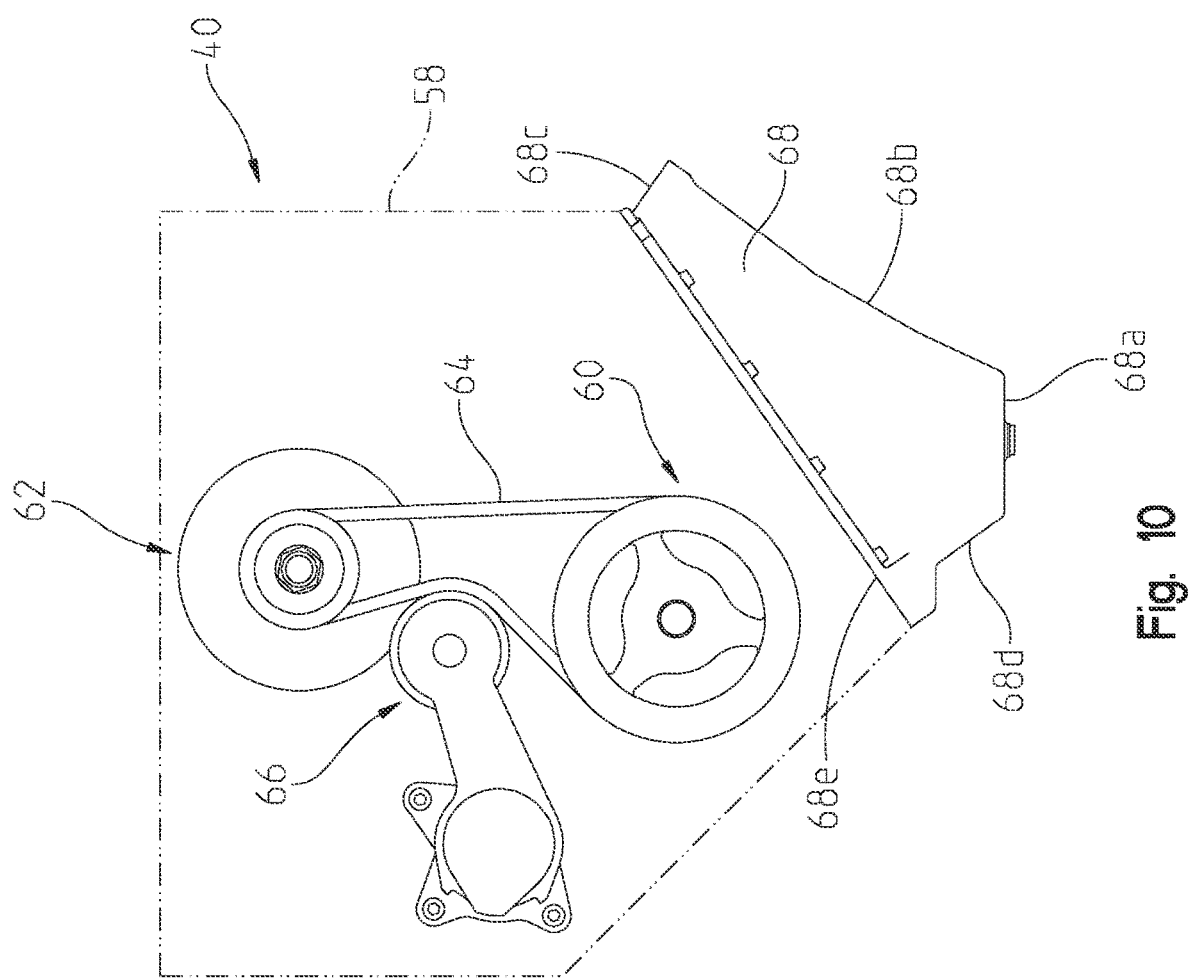

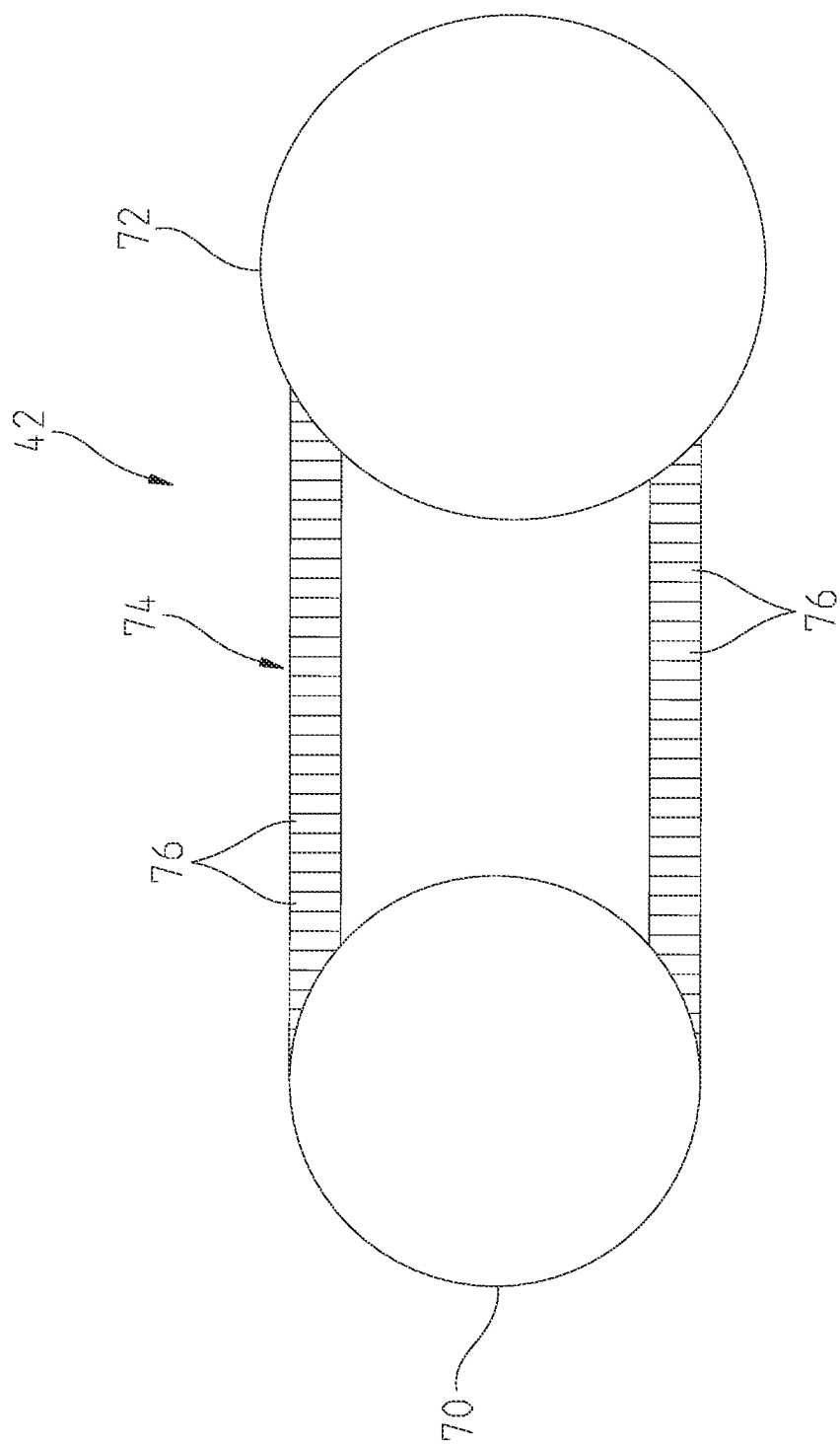

POWERTRAIN FOR A UTILITY VEHICLE

CROSS-REFERENCE TO RELATED APPLICATION

The present application is a continuation of U.S. patent application Ser. No. 17/147,937, filed Jan. 13, 2021, which claims priority to U.S. Provisional Application No. 62/961,442, filed Jan. 15, 2020, the entire disclosures of which are incorporated herein by reference.

FIELD OF THE DISCLOSURE

The present application relates to a utility vehicle and, more particularly, a powertrain assembly for a utility vehicle.

BACKGROUND OF THE DISCLOSURE

Utility vehicles ("UTVs"), including side-by-side vehicles, and all-terrain vehicles ("ATVs") are configured to travel on off-road surfaces and over a variety of terrain. The power capabilities of such vehicles must be sufficient for various drive modes (e.g., those dependent on the terrain) and to meet the expectations of the rider. However, engines and transmissions large enough to sufficiently meet the power and rider demands may be difficult to fit on a trail-compatible vehicle because of interference with other components or systems (e.g., rear suspension, cargo box, etc.). As such, there is a need for an off-road vehicle with sufficient powertrain capabilities to meet increased rider expectations while maintaining a compact configuration and width for riding on trails.

SUMMARY OF THE DISCLOSURE

In one embodiment, a utility vehicle comprises a plurality of ground-engaging members; a frame assembly supported on the plurality of ground-engaging members; and a powertrain assembly supported by the frame assembly. The powertrain assembly comprises an engine and a transmission. The engine is separate from the transmission and longitudinally aligned with a portion of the transmission in a fore/aft direction of the utility vehicle.

In a further embodiment, a utility vehicle comprises a plurality of ground-engaging members; a frame assembly supported on the plurality of ground-engaging members and extending along a longitudinal axis; a cargo area supported on the frame assembly; and a powertrain assembly supported by the frame assembly and comprising an engine, a transmission, and a prop shaft operably coupled to the transmission and the plurality of ground-engaging members. The engine comprises a crankcase and a cylinder body positioned above the crankcase. The cylinder body is angled relative to vertical and positioned below a portion of the cargo area and over a portion of the prop shaft.

In another embodiment, a utility vehicle comprises a plurality of ground-engaging members, a frame assembly supported on the plurality of ground-engaging members and extending along a longitudinal axis, and a powertrain assembly supported by the frame assembly. The powertrain assembly comprises an engine, a transmission operably coupled to the engine, and a prop shaft operably coupled to the transmission. From a rear view of the utility vehicle, an output of the engine is positioned to a first side of the longitudinal axis, an output of the transmission is positioned to a second side of the longitudinal axis, and the prop shaft is configured to rotate in a clockwise direction for forward movement of the utility vehicle.

In yet another embodiment, a utility vehicle comprises a plurality of front ground-engaging members, a plurality of rear ground-engaging members, a frame assembly supported on the plurality of front and rear ground-engaging members and extending along a longitudinal axis, and a powertrain assembly supported by the frame assembly. The powertrain assembly comprises an engine, a steel belt continuously variable transmission operably coupled to the engine and comprising a drive pulley and a driven pulley, a prop shaft operably coupled to the transmission, and a disconnect positioned between an output of the driven pulley of the transmission and the plurality of rear ground-engaging members. The disconnect is configured to decouple the rear ground-engaging members from power at the output of the transmission.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 3A is a schematic view of a powertrain assembly of the vehicle of FIG. 1, where a transmission is coupled to and separate from a differential;

FIG. 3B is a schematic view of the powertrain assembly of the vehicle of FIG. 1, where the transmission includes the differential;

FIG. 3C is a schematic top view of the powertrain assembly of FIG. 3B having an alternative rear differential;

FIG. 3D is a top view of the powertrain assembly of any of FIGS. 3A-3C;

FIG. 3E is a left side view of the powertrain assembly of FIG. 3D;

FIG. 3H is a top view of the powertrain assembly of FIG. 3D including a transfer case operably coupled to the transmission;

FIG. 3I is a left side view of the powertrain assembly of FIG. 3H;

FIG. 4A is a top view of an alternative configuration of the powertrain assembly of any of FIGS. 3A-3G having an engine position forward of the transmission;

FIG. 4B is a left side view of the powertrain assembly of FIG. 4A;

FIG. 4C is a front view of the powertrain assembly of FIG. 4A;

FIG. 4D is a rear view of the powertrain assembly of FIG. 4A;

FIG. 4G is a top view of an alternative powertrain assembly of FIG. 4A including a rear differential integrated with the transmission;

FIG. 10 is a schematic view of a crankcase of an engine of the powertrain assembly of any of FIGS. 3A-4G coupled to an oil pan;

FIG. 11 is a schematic view of a steel belt continuously variable transmission of the powertrain assembly of any of FIGS. 3A-4G;

Figure 1:
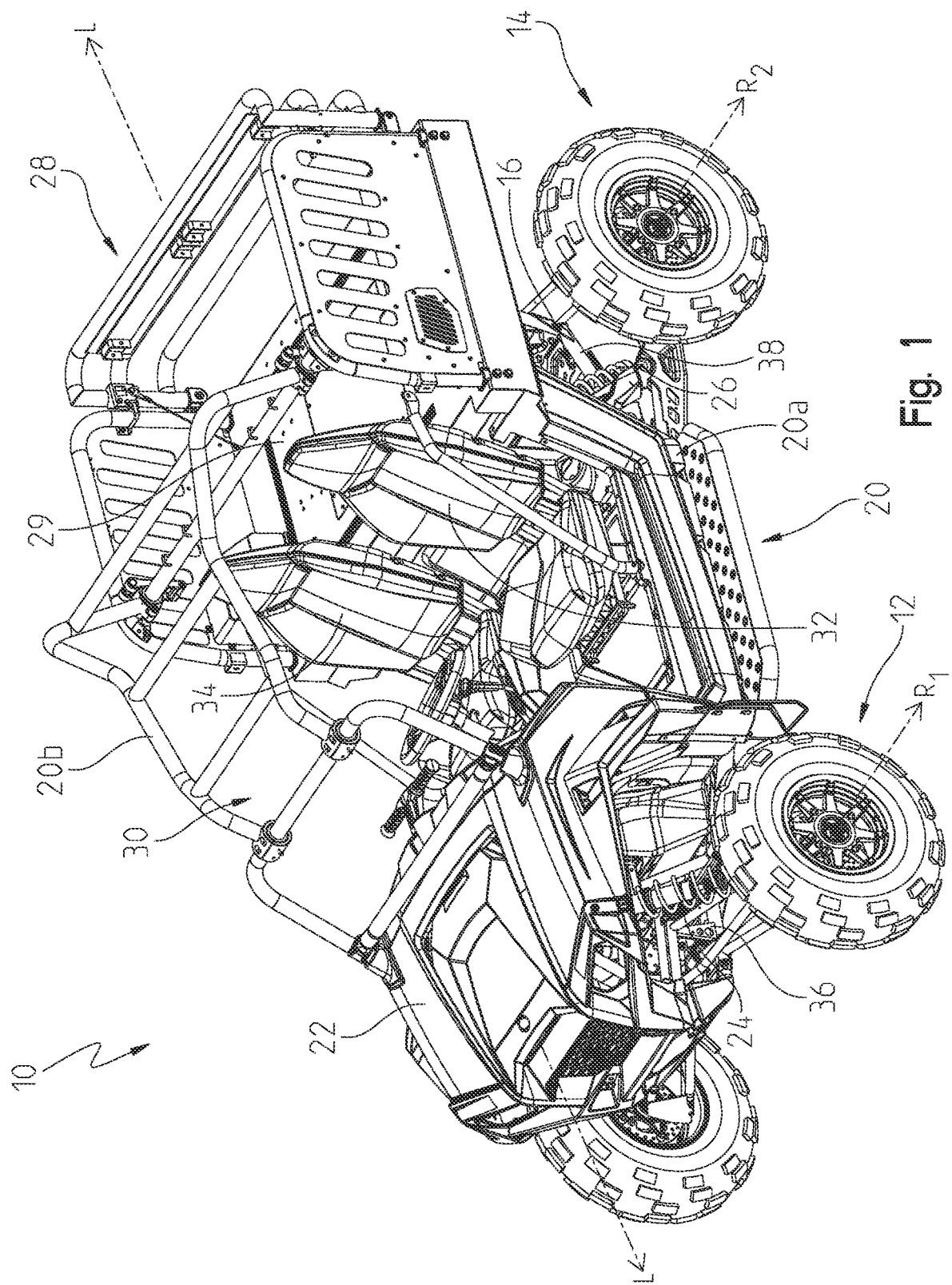
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 2:
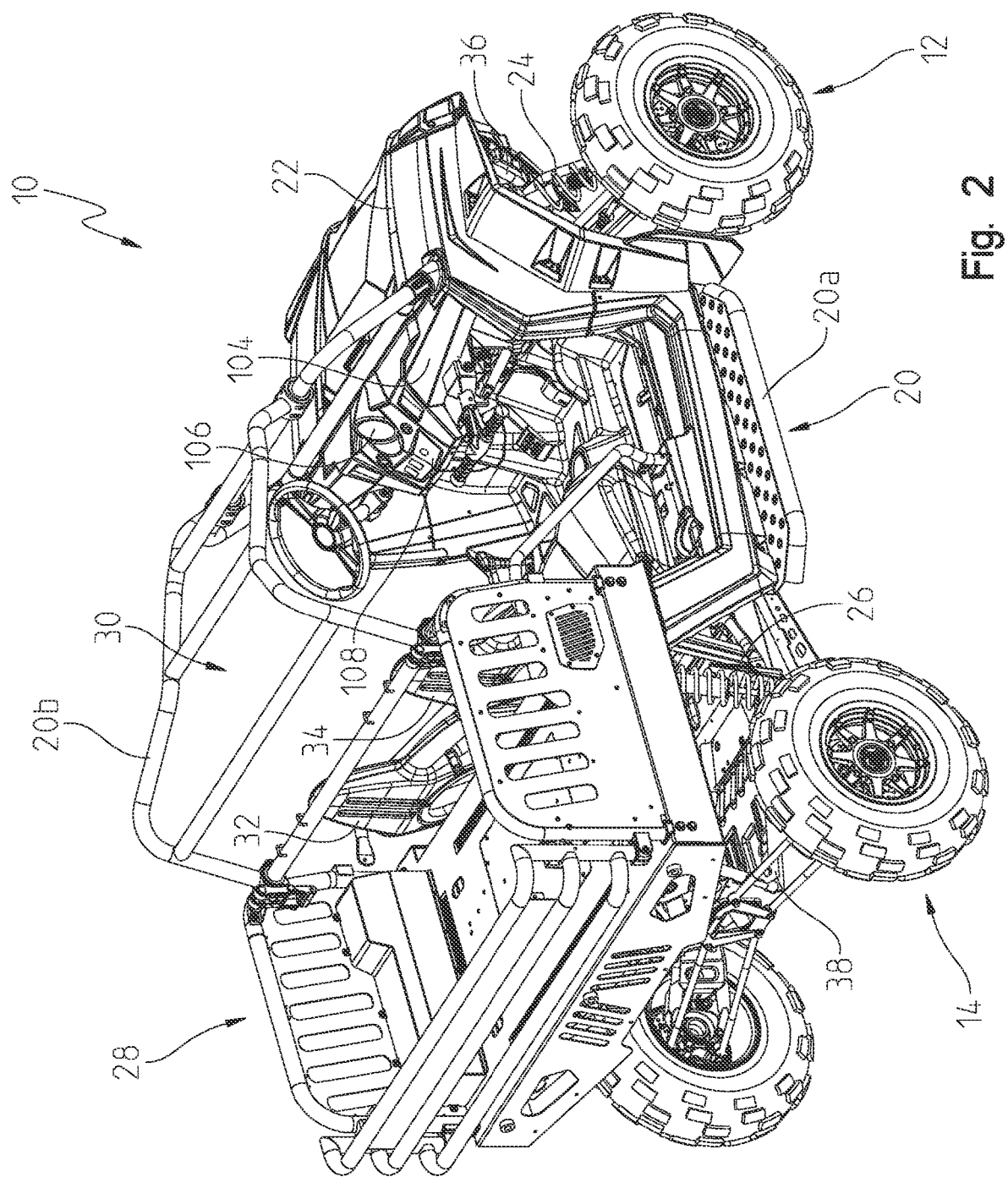
FIG. 2 is a rear right perspective of the vehicle of FIG. 1.

Referring to FIGS. 1 and 2, an illustrative embodiment of a utility vehicle 10 is shown. Vehicle 10 includes ground-engaging members, including front ground-engaging members 12 having an axis of rotation $R_1$ and rear ground-engaging members 14 having an axis of rotation $R_2$, a powertrain assembly 16 (FIGS. 3A-4G), a frame assembly 20, a plurality of body panels 22 coupled to frame assembly 20, a front suspension assembly 24, a rear suspension assembly 26, and a rear cargo area 28 having a cargo bed surface 29. In one embodiment, one or more ground engaging members 12, 14 may be replaced with tracks, such as the PROSPECTOR II tracks available from Polaris Industries, Inc. located at 2100 Highway 55 in Medina, Minn. 55340, or non-pneumatic tires. Vehicle 10 may be referred to as a utility vehicle ("UTV"), an all-terrain vehicle ("ATV"), or a side-by-side vehicle ("SxS") and is configured for travel over various terrains or surfaces and may be compatible for riding on trails. More particularly, vehicle 10 may be configured for military, industrial, agricultural, or recreational applications.

Referring still to FIGS. 1 and 2, vehicle 10 includes an operator area 30 supported by frame assembly 20, and which includes seating for at least an operator and a passenger. Illustratively, one embodiment of vehicle 10 includes an operator seat 32 and a front passenger seat 34 in a side-by-side arrangement. Operator seat 32 includes a seat bottom, illustratively a bucket seat, and a seat back. Similarly, front passenger seat 34 includes a seat bottom, illustratively a bucket seat, and a seat back. While the seating is shown as separate, side-by-side seats, it may be appreciated that the seating may include a bench seat having a driver portion and a passenger portion. Additionally, cargo area 28 may be configured to support additional passengers and/or cargo items.

Frame assembly 20 of vehicle 10 is supported by ground engaging members 12, 14. Frame assembly 20 includes a lower frame assembly 20a and an upper frame assembly 20b. Lower frame assembly 20a includes a front frame portion 36 and a rear frame portion 38 positioned along a longitudinal axis or centerline L of vehicle 10. Longitudinal axis L is generally perpendicular to vertical and to axes of rotation $R_1$ and $R_2$ of front and rear ground-engaging members 12, 14, respectively. Upper frame assembly 20b is coupled to lower frame assembly 20a and cooperates with operator area 30 to define a cab of vehicle 10.

Powertrain assembly 16 is operably supported on frame assembly 20 and is drivingly connected to one or more of ground engaging members 12, 14. As shown in FIGS. 5A-9B, powertrain assembly 16 is supported on rear frame portion 38 and, therefore, at least portions of powertrain assembly 16 are positioned rearward of seats 32, 34, as disclosed in further detail herein. Powertrain assembly 16 may include an engine 40 and a transmission 42. In one embodiment, transmission 42 may be a continuously variable transmission ("CVT") and/or a shiftable transmission.

Powertrain assembly 16 also includes at least a front differential 44, a rear differential 46, and a drive shaft or prop shaft 48 extending therebetween. Front differential 44 is operably coupled to front ground-engaging members 12 and rear differential 46 is operably coupled to rear ground-engaging members 14. As disclosed further herein, prop shaft 48 includes a first or front prop shaft 48a operably coupled to transmission 42 and front differential 44 and a second or rear prop shaft 48b operably coupled to transmission 42 and rear differential 46. Torsional dampers (e.g., comprised of rubber) may be included on or for prop shaft 48 to prevent vibrational or other feedback from being transmitted from prop shaft 48 to transmission 42.

Figure 3G:
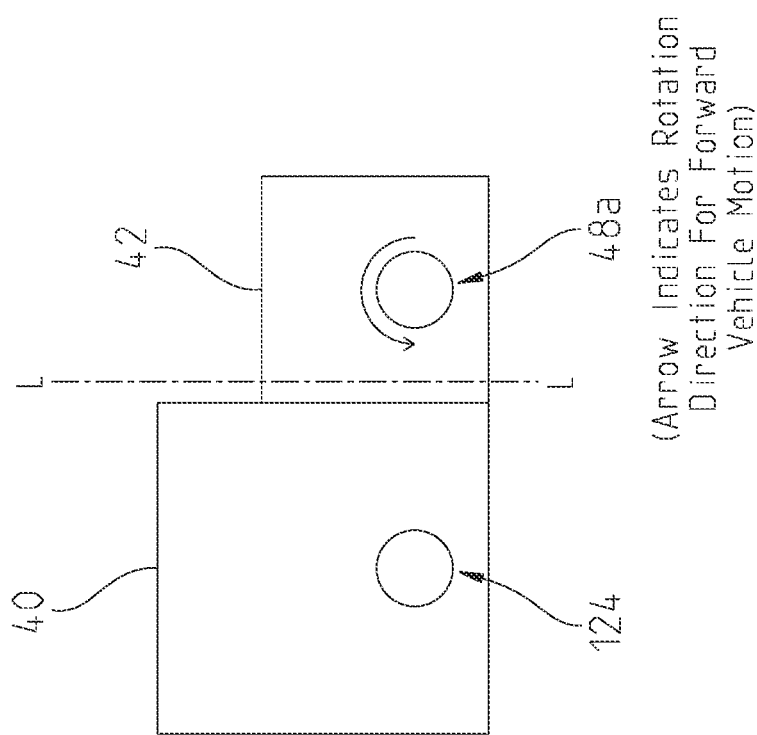
FIG. 3G is a front view of the powertrain assembly of FIG. 3D.

Referring to FIGS. 3A-3I, various embodiments are shown schematically in which engine 40 is positioned rearward of transmission 42. In such embodiments, and as disclosed further herein in more detail, prop shaft 48 may be angled laterally up to 20° relative to longitudinal axis L, as shown in FIG. 3D. In the illustratively embodiment of FIG. 3D, both front and rear prop shafts 48a, 48b are angled (angle α) to the left side of vehicle 10 and, therefore, may be angled up to 20° to the left of longitudinal axis L. However, front and rear prop shafts 48a, 48b also may angled by angle α up to 20° to the right of longitudinal axis L.

As shown in FIG. 3E, prop shaft 48 also may be angled vertically relative to a line horizontal to the ground plane by angle α (i.e., up to 20°). Illustratively, both front and rear prop shafts 48a, 48b are angled vertically above the line horizontal to the ground plane (i.e., the ground or surface supporting vehicle 10) in order to couple with the output of engine (centerline of engine power output shown at 124) and front and rear differentials 44, 46, respectively. However, front and rear prop shafts 48a, 48b also may be angled vertically below the line horizontal to the ground plane.

Figure 3F:
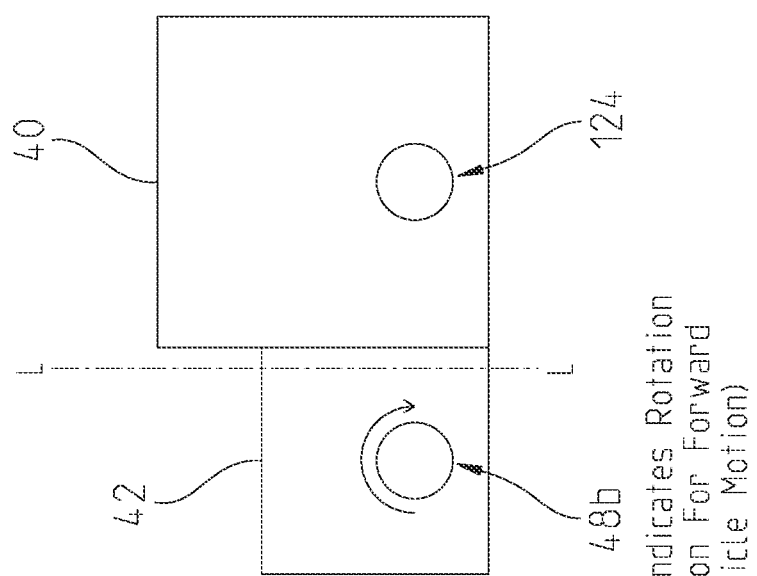
FIG. 3F is a rear view of the powertrain assembly of FIG. 3D.

In the embodiment of FIGS. 3A-3E, in which engine 40 is positioned rearward of transmission 42, when looking at the rear view of FIG. 3F, it is apparent that rear prop shaft 48b rotates in a clockwise direction for forward motion of vehicle 10. It is also apparent that centerline of engine power output 124 is positioned to a first/the right of longitudinal axis L. Additionally, as shown in the front view of FIG. 3G, when engine 40 is positioned rearward of transmission 42, front prop shaft 48a rotates in a counterclockwise direction for forward motion of vehicle 10 and centerline of engine power output 124 is seemingly positioned to the left of longitudinal axis L but is still positioned on the right side of vehicle 10 relative to longitudinal axis L.

In one embodiment, powertrain assembly 16 of FIGS. 3A-3G may include a transfer case 41 operably coupled to transmission 42, as shown in FIG. 3H. Both front and rear prop shafts 48a, 48b may be angled (angle α) laterally up to 20° relative to longitudinal axis L to operably couple with transfer case 41. Illustratively, front prop shaft 48a is angled laterally to the right of longitudinal axis L while rear prop shaft 48b is angled laterally to the left of longitudinal axis L; however, it may be appreciated that front and rear prop shaft 48a, 48b may be angled laterally to the right or left of longitudinal axis L.

Additionally, as shown in FIG. 3I, when powertrain assembly 16 includes transfer case 41 and engine 40 is positioned rearward of transmission 42, both front and rear prop shafts 48a, 48b may be angled vertically (angle α) up to 20° relative to a line horizontal to the ground plane. Illustratively, front and rear prop shafts 48a, 48b are angled vertically above the line horizontal to the ground plane by angle α; however, it may be appreciated that front and rear prop shafts 48a, 48b may be angled vertically downward relative to the line horizontal to the ground plane.

From at least FIGS. 3A-3I, it is apparent that engine 40 and transmission 42 are longitudinally mounted in vehicle 10 (i.e., are in a longitudinally overlapping relationship with each other such that at least a portion of engine 40 and at least a portion of transmission 42 are aligned in the fore/aft direction) and, from a rear view, centerline of engine power output 124 is positioned to the first/right side of longitudinal axis L and an output 100 of transmission 42 spins rear prop shaft 48b in a clockwise direction (FIG. 3F). As such, while other vehicles (e.g., automotive/on-road vehicles) also may be configured for the output of the transmission to rotate in a clockwise direction (from a rear view of the vehicle), the engine and transmission of such vehicles are laterally aligned (i.e., the engine and transmission are in a lateral/side-by-side relationship with each other) which can contribute to an increased width of the vehicle. Because of this increased width, such vehicles having an engine laterally aligned with a transmission may not be trail-compatible and not typically configured for off-road terrain.

Herein, the embodiments of FIGS. 3A-3I are disclosed in further detail and in non-schematic representations. However, as is disclosed hereinafter, various embodiments of powertrain assembly 16 are configured with engine 40 positioned forward of transmission, as shown in FIGS. 4A-4F. Various aspects of the disclosure of FIGS. 5A-14B are equally applicable to the powertrain configuration of FIGS. 4A-4F.

Irrespective of the position of engine 40 relative to transmission 42, engine 40 may be a fuel-burning internal combustion engine, however, any engine assembly may be contemplated, such as hybrid, fuel cell, or electric engines or units. In one embodiment, powertrain assembly 16 includes a turbocharger (not shown).

As shown in FIGS. 5A-9B, powertrain assembly 16 is shown with engine 40 positioned rearward of transmission 42. Engine 40 is supported on rear frame portion 38. More particularly, rear frame portion 38 includes upper longitudinally-extending members 38a, lower longitudinally-extending members 38b, and at least one cross-member 38c extending therebetween. Various embodiments of rear frame portion 38 may include one cross-member 38c or a plurality of cross-members 38c in any orientation relative to upper and lower longitudinally-extending members 38a, 38b. For example, as shown in FIGS. 7-9B, an alternative rear frame portion 38' is shown having upper longitudinally-extending frame members 38a', lower longitudinally-extending frame members 38b', and at least one cross-member 38c'.

With respect to FIGS. 5A-9B, engine 40 and/or transmission 42 is/are supported on at least one of lower longitudinally-extending frame members 38b, 38b' and/or at least one of upper longitudinally-extending frame members 38a, 38a' using metallic mounts 54 and isolators comprised of vibration-dampening material (not shown). Mounts 54 are shown schematically and, in embodiments, at least three mounts 54 may be used to couple engine 40 and/or transmission 42 to upper and/or lower longitudinally-extending frame members 38a, 38a', 38b, 38b'.

Additionally, engine 40 may be supported on a housing 78 of transmission 42 with at least two mounting portions. For example, housing 78 of transmission 42 may include a mounting plate or planar surface 50 at a rearward extent thereof which is configured to mate with a corresponding mounting or planar surface 52 of engine 40 such that transmission 42 and engine 40 are mounted together. Conventional fasteners, such as bolts (not shown), may extend into/through mounting surfaces 50, 52. Mounting surface 50 and/or mounting surface 52 may individually or collectively define a bell housing. A torsional damper (not shown) may be positioned longitudinally intermediate mounting surfaces 50, 52.

Referring to FIG. 10, illustrative engine 40 includes a cylinder body 56 (FIGS. 7 and 8) comprising at least one cylinder configured to receive a piston (not shown) therein, a crankcase 58 configured to support a crankshaft 60 and coupled to cylinder body 56, and a drive assembly comprising a cam assembly 62 operably coupled to crankshaft 60 through a belt or chain 64 and a belt tensioner 66. In various embodiments, engine 40 may include any number of cylinders, such as one cylinder, two cylinders, three cylinders, four cylinders, six cylinders, or eight cylinders. Additionally, engine 40 includes an oil pan 68 coupled to crankcase 58. As shown in FIG. 10, oil pan 68 is angled along a lower extent of crankcase 58 and, more particularly, includes a bottom-most surface 68a in a generally horizontal configuration and additional sides (illustratively 68b, 68c, 68d, 68e) which are angled relative to horizontal and vertical. As disclosed further herein, the angularity of oil pan 68 allows for packaging powertrain assembly 16 relative other components of vehicle 10 supported at rear frame portion 38. While engine 40 illustratively includes oil pan 68, engine 40 also may be configured as a dry sump engine.

As shown best in FIG. 11, transmission 42 may be any type of transaxle, such as planetary, automatic, manual, dual clutch transmission ("DCT"), automated manual, automated shift transmission ("AST"), etc. Illustratively, transmission 42 is shown as a steel belt continuously variable transmission ("CVT") in that, instead of a traditional rubber belt extending around and between the drive and driven clutches, a belt comprised of a plurality of steel blocks or plates extends around and between the drive and driven clutches. For example, as shown in FIG. 11, transmission 42 includes a drive clutch or pulley 70 (e.g., a variator pulley), a driven clutch or pulley 72 (e.g., a variator pulley), and a steel belt 74 entrained about both drive and driven clutches 70, 72. Belt 74 is comprised of a plurality of steel blocks or plates 76 and also may include metallic (e.g., steel) bands (not shown) extending along both sides of all steel blocks 76. In this way, the steel bands support all of steel blocks 76 and, together, create a channel in which steel blocks 76 are positioned.

As shown in FIGS. 4-9B, housing 78 of transmission 42 is configured to support clutches 70, 72 and steel belt 74 therein. Housing 78 includes mounting plate 50 for coupling with engine 40. As disclosed further herein, transmission 42 is positioned forward of at least a portion of engine 40 such that mounting plate 50 is positioned at a rearward extent of transmission 42 and couples with a forward extent or surface of mounting surface 52 on engine 40. Transmission 42 also is operably coupled to engine 40 through crankshaft 60 (FIG. 10) such that crankshaft 60 couples with an input shaft 80 (FIG. 12) of transmission 42 on the axis rotation of drive clutch 70.

As shown in FIG. 3A, transmission 42 may include a separate differential 43 coupled to output 100. However, in other embodiments, output 100 of transmission 42 may include an integrated differential 43, as shown in FIG. 3B. Differential 43 is a locked, controlled, or limited-slip differential. If differential 43 is a controlled differential, torque limiting capabilities are possible such that if torque to different ground-engaging members 12 exceeds a threshold, the clutches of differential 43 can slip. This embodiment allows various components to be downsized and also minimizes or prevents damage to various driveline components. In one embodiment, differential 43 is positioned forward of transmission 42 and coupled thereto or is positioned at a forward portion of transmission 42 within housing 78 of transmission 42. Alternatively, differential 43 may be at any position relative to clutches 70, 72 and housing 78. In other embodiments of vehicle 10, powertrain assembly 16 may not include any differential at the location of differential 43. In such embodiments, there is no differential between front and rear prop shafts 48a, 48b.

Figure 12:
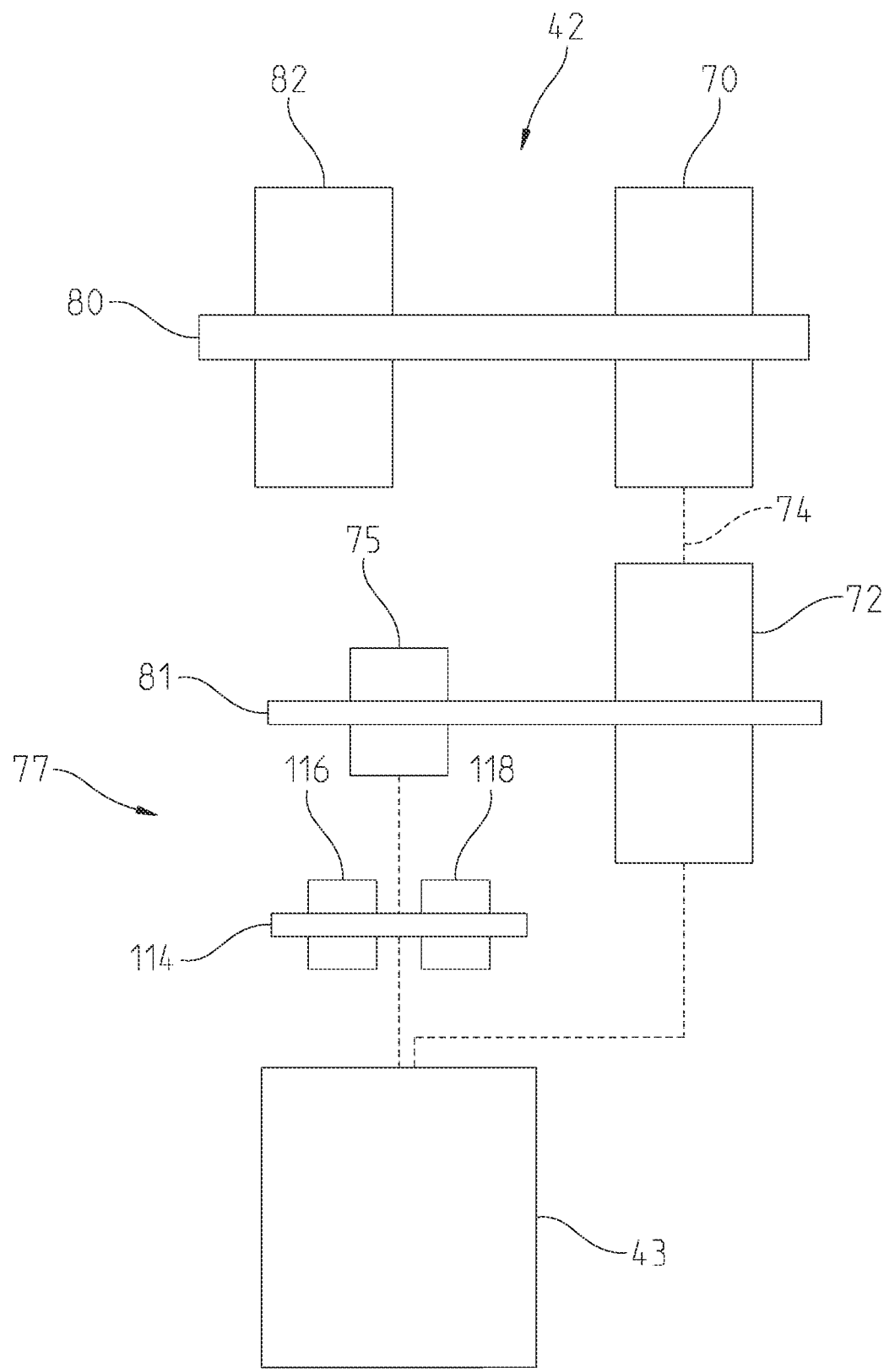
FIG. 12 is a schematic view of the internals of the continuously variable transmission of the powertrain assembly of any of FIGS. 3A-4G, including a differential and a wet clutch assembly.

Referring to FIG. 12, rather than a torque converter, input shaft 80 of transmission 42 also may have a wet clutch assembly 82 comprising two wet plate clutches with a planetary gear on an input shaft of transmission 42, instead of a reverse dog. In one embodiment, wet clutch assembly 82 is an electronically-controlled and hydraulically-actuated wet engagement clutch. Such a configuration allows for shifting on the fly such that wet clutch assembly 82 allows for gear changes between forward and reverse while vehicle 10 is moving. Additionally, if slip occurs during operation of vehicle 10, the slip would occur at wet clutch assembly 82. Slip may occur up to a threshold RPM indefinitely. In this way, wet clutch assembly 82 protects additional systems or components of powertrain assembly 16 (e.g., prop shaft 48) and vehicle 10 by being configured to slip under predetermined parameters.

While wet clutch assembly 82 is disclosed herein, it may be appreciated that a torque converter may be used instead of wet clutch assembly 82. With a torque converter, if the fluid is sufficiently cooled, it can slip indefinitely. In another embodiment, instead of a torque converter or wet clutch assembly 82, a dry clutch may be used, however, a dry clutch may be limited in slipping compared to the slip available with wet clutch assembly 82 and a torque converter.

Referring to FIG. 12, transmission 42 also may include a three-gear set 75 for operating vehicle 10 in at least low gear and high gear. More particularly, three-gear set 75 may be operably coupled to driven clutch 72 of transmission 42 and to differential 43 of transmission 42 through a pinion drive 77. As shown best in FIG. 12, three-gear set 75 may be positioned along a secondary shaft 81 and outward of driven clutch 72. Three-gear set 75 is in meshed engagement with pinion drive 77. Pinion drive 77 is engaged with differential 43. As such, transmission 42 is configured to provide discrete gears (e.g., high, low, neutral), a continuous range of gear ratios through drive clutch 70, driven clutch 72, and belt 74, and forward and reverse operation.

With respect to pinion drive 77, two-stage gear reduction is possible because pinion drive 77 includes a pinion shaft 114, a first gear 116, and a second gear 118. First and second gears 116, 118 can be used to create different gear ratios. It may be appreciated that transmission 42 is configured for forward and reverse operation and at least low-gear and high-gear operation through wet clutch assembly 82, three-gear set 75, and/or pinion drive 77.

Referring still to FIGS. 3A-9B, powertrain assembly 16 includes front differential 44 operably coupled to transmission 42 such that transmission 42 provides power to front ground-engaging members 12. In particular, output shaft 100 of transmission 42 is operably coupled to front prop shaft 48a to provide rotational power to front ground-engaging members 12 through front prop shaft 48a. It may be appreciated that vehicle 10 is configured for all-wheel/four-wheel drive operation, which, in some embodiments, may be selectively engaged by the driver, because transmission 42 provides driving power to all of ground-engaging members 12, 14 by selectively engaging (or disengaging) with front differential 44. When in 4WD (i.e., front prop shaft 48a and front differential 44 are engaged), torque sensing is possible in transmission 42 via front prop shaft 48a or front differential 44.

Also shown in FIGS. 3A-9B, rear differential 46 is operably coupled to transmission 42 such that transmission 42 provides power to rear ground-engaging members 14. In particular, output shaft 100 of transmission 42 is operably coupled to rear prop shaft 48b to provide rotational power to rear ground-engaging members 14 through rear prop shaft 48b. Rear differential 46 is configured to be selectively locked or unlocked by the driver.

Both front and rear differentials 44, 46 may be disconnected from transmission 42 when necessary to operate vehicle 10 in various modes, when vehicle 10 needs to be towed, or when vehicle 10 tows another vehicle. In one embodiment, the disconnect mechanism may be positioned anywhere between driven pulley 72 of transmission 42 and rear ground-engaging members 14. While the illustrative example of this disconnect is shown with respect to rear differential 46 in FIGS. 13-14B, it may be appreciated that the same disconnect mechanism is applicable to front differential 44 or any other mechanism configured to disconnect front or rear differentials 44, 46 from transmission 42. Front and/or rear differentials 44, 46 may be selectively disconnected from transmission 42 at the selective discretion of the driver.

Figure 13:
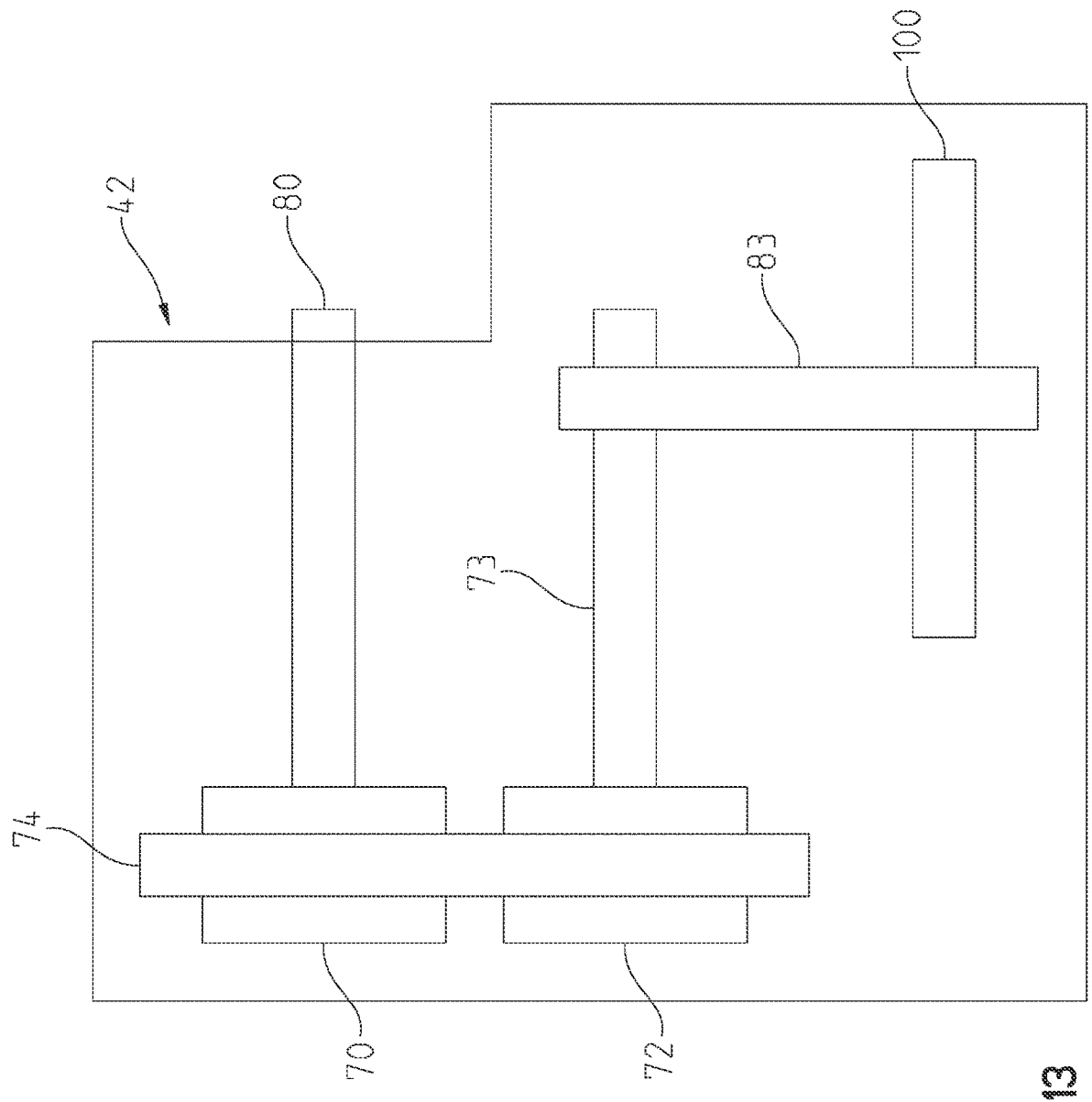
FIG. 13 is a schematic view of a coupling assembly for coupling together a portion of a prop shaft and a rear differential of the powertrain assembly of any of FIGS. 3A-4G.

In one embodiment, as shown in FIG. 13, the disconnect for front and rear differentials 44, 46 is within transmission 42 such that front and rear prop shafts 48a, 48b disconnect from output 100 of transmission 42. More particularly, a first embodiment coupling assembly or mechanism 83 is configured to selectively couple transmission output shaft 100 with an output shaft 73 of driven pulley 72 of transmission 42. In this way, if it is desirable to prevent driven pulley 72 and rear ground-engaging members 14 from spinning together (e.g., in a tow situation), output shaft 73 of driven pulley 72 of transmission 42 is disconnected from transmission output shaft 100 such that driven pulley 72 does not spin when rear ground-engaging members 14 spin during a tow condition.

Figure 14A:
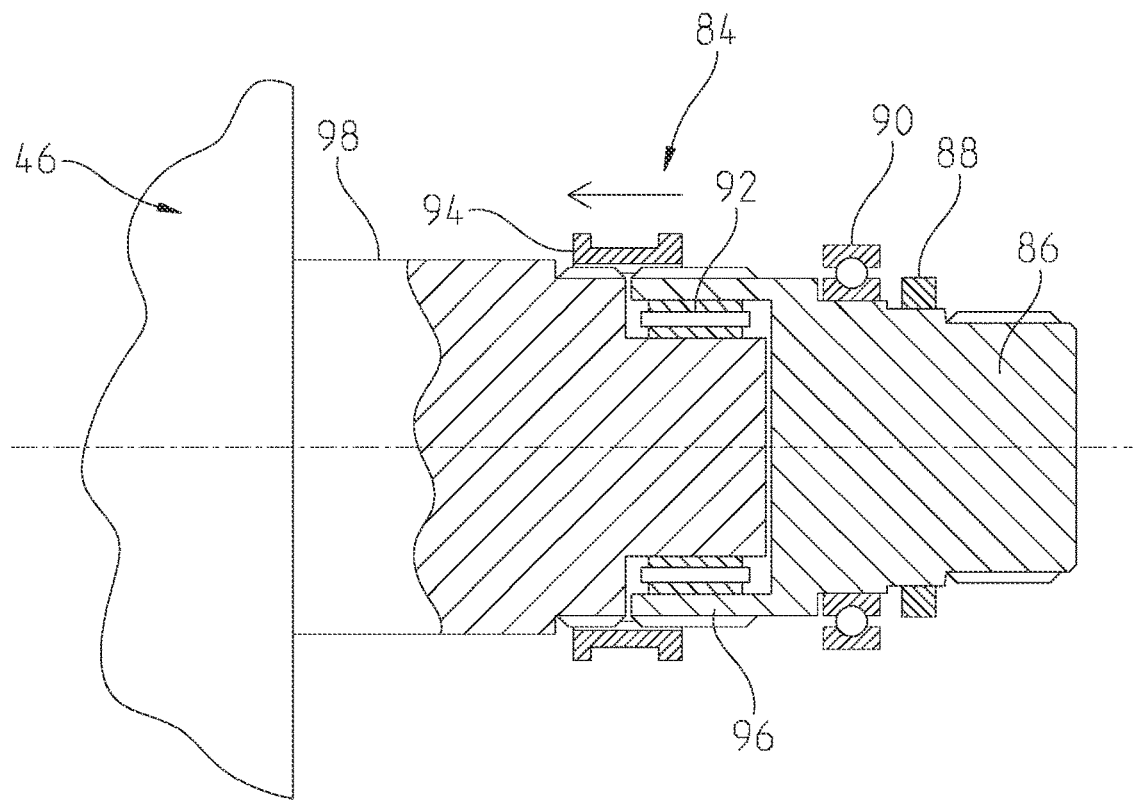
FIG. 14A is a top cross-sectional view of an alternative coupling assembly for coupling together the portion of the prop shaft and the rear differential of the powertrain assembly of any of FIGS. 3A-4G, with the coupling assembly in a connected position.
Figure 14B:
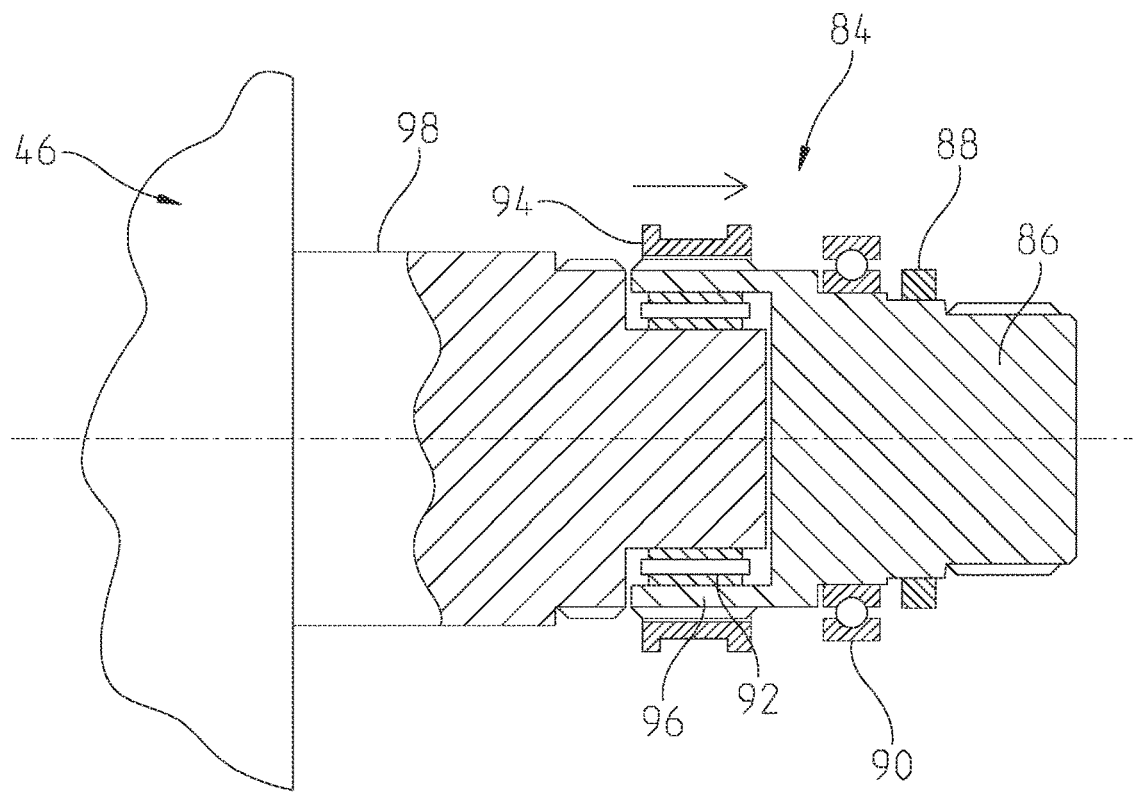
FIG. 14B is a top cross-sectional view of the coupling assembly of FIG. 14A in a disconnected position.

As shown in FIGS. 14A and 14B, a second embodiment of the disconnect mechanism includes a coupling assembly 84 configured to operably couple rear prop shaft 48b with rear differential 46. Coupling assembly 84 may be positioned within a housing of rear differential 46 or may be separate from rear differential 46 and rear prop shaft 48b. Coupling assembly 84 includes a shaft 86, a seal 88, a first bearing 90, a second bearing 92, and a collar 94. Illustrative shaft 86 is a splined shaft coupled to or integrated with rear prop shaft 48b. Shaft 86 seals against the rear extent of rear prop shaft 48b through seal 88. First bearing 90 is positioned radially intermediate shaft 86 and rear prop shaft 48b.

Shaft 86 includes a receiving end 96 configured to receive a pinion drive 98 of rear differential 46. Second bearing 92 is positioned radially intermediate pinion drive 98 and receiving end 96 of shaft 86. Collar 94 is positioned along the outer surface or outer diameter of receiving end 96 of shaft 86 and is configured for longitudinal sliding movement along the outer surface of receiving end 96. In particular, and as shown in FIG. 14A, collar 94 may be moved longitudinally rearward to a position along the outer surface of receiving end 96 of shaft 86 and along an outer surface of pinion drive 98 such that collar 94 spans the connection location between pinion drive 98 of rear differential 46 and shaft 86 of rear prop shaft 48b. In this way, collar 94 maintains rear prop shaft 48b in connection with rear differential 46 and, as rear prop shaft 48b rotates, shaft 86 rotates with rear prop shaft 48b.

However, as shown in FIG. 14B, when rear prop shaft 48b is to be disconnected from rear differential 46, collar 94 may be moved forwardly towards rear prop shaft 48b such that collar 94 is only positioned along the outer surface of receiving end 96 of shaft 86. In this way, collar 94 does not connect pinion drive 98 of rear differential 46 to shaft 86 and, as such, when rear prop shaft 48b rotates, pinion drive 98 does not rotate with rear prop shaft 48b. Instead, rear prop shaft 48b merely rotates about pinion drive 98.

Collar 94 may longitudinally slide between the connected position of FIG. 14A and the disconnected position of FIG. 14B using an actuator or lever. In one embodiment, an actuator configured to move collar 94 may be associated with an input (e.g., a button, touchscreen graphic or input, lever, knob, or any other operator input) within operator area 30 such that the operator may selectively move collar 94 between the connected and disconnected position. Additionally, a torque-limiting clutch pack having a clutch arrangement which is open and unpressurized may be used to facilitate movement of collar 94, either in response to the operator input and an actuator for collar 94 or to facilitate automatic movement of collar 94 based on operating conditions for vehicle 10 and/or powertrain assembly 16.

Alternatively, the operator may manually move or remove a pin from the connection of rear prop shaft 48b to rear differential 46 and/or transmission 42. In another alternative embodiment, a manual, cable-operated disconnect may be used which would provide for a neutral state regardless of the gear position of transmission 42 (although it may be appreciated that transmission 42 does include a neutral mode where wet clutch assembly 82 is held open). As such, various alternative embodiments and equivalent connect and disconnect mechanisms may be used.

Regardless of the mechanical features for disconnecting rear prop shaft 48b, as noted herein, rear prop shaft 48b may be selectively disconnected by a selective input from the user or may be automatically disconnected in response to various parameters. For example, rear prop shaft 48b may be disconnected once a particular parameter has been achieved. Such parameters may relate to driving conditions, powertrain operating conditions, etc. and/or may relate to a sequence of steps (e.g., disconnecting rear prop shaft 48b may occur after a particular step has been satisfied, such as in response to a gear selection (e.g., Neutral or Park)). It may be appreciated that front prop shaft 48a may be disconnected from front differential 44 and/or transmission 42 through the above mechanisms discussed with respect to rear prop shaft 48b.

Referring still to FIGS. 5A-9B, many components of powertrain assembly 16 are supported by rear frame portion 38. Such components of powertrain assembly 16 are positioned with respect to many other vehicle systems and components, such as rear suspension assembly 26, cargo bed surface 29, operator area 30, seats 32, 34, and various members of frame assembly 20. Illustratively, rear differential 46 is positioned at a rearward extent of rear frame portion 38 and laterally intermediate lower longitudinally-extending frame members 38b, 38b'. As shown best in FIG. 6, rear differential 46 is generally positioned laterally intermediate axis of rotation $R_2$ of rear ground-engaging members 14 and along longitudinal axis L.

In one embodiment, rear prop shaft 48b may be generally parallel to horizontal, the ground plane, or longitudinal axis L and approximately perpendicular to vertical. In other embodiments, rear prop shaft 48b may be angled up to 20° relative to horizontal (e.g., relative to the line horizontal to the ground surface). If rear prop shaft 48b is angled more than 20°, heat, noise, and other issues could be present in powertrain assembly 16 and, therefore, illustrative rear prop shaft 48b may be angled up to approximately 20° but is not angled more than 20° relative to horizontal/ground plane.

At least a portion of engine 40 is positioned to the right of rear prop shaft 48b and adjacent at least one of lower longitudinally-extending frame members 38b, 38b'. Additionally, a portion of engine 40 may extend above and over prop shaft 48. Engine 40 also may be positioned below various upper longitudinally-extending members 38a, 38a'. As such, engine 40 may be angled relative to vertical such that cylinder body 56 and the corresponding cylinder head(s) are positioned below upper longitudinally-extending members 38a, 38a' and also cargo bed surface 29. More particularly, and as shown best in FIGS. 7-9B, crankcase 58 is positioned on the right side of vehicle 10 and on the right side of longitudinal axis L. However, cylinder body 56 may be angled towards the left side of vehicle 10 relative to vertical so as to not interfere with cargo bed surface 29. As such, cylinder body 56 is angled relative to longitudinal axis L and vertical and at least the cylinder head is positioned generally to the left of longitudinal axis L. In this way, engine 40 intersects or overlaps with longitudinal axis L such that a first portion of engine 40 (e.g., crankcase 58) is positioned to one side of longitudinal axis L and a second portion of engine 40 (e.g., cylinder body 56) is positioned to the second side of longitudinal axis L.

Similarly, the first portion of engine 40 is positioned to a first side of rear prop shaft 48*b* and the second portion of engine 40 is positioned to a second side of rear prop shaft 48*b*. At least a portion of engine 40 (illustratively cylinder body 56) also may be positioned over a portion of rear prop shaft 48*b*. In this way, rear prop shaft 48*b* is positioned laterally adjacent crankcase 58 and positioned under cylinder body 56. By positioning at least crankcase 58 towards the right side of vehicle 10, the angle of rear prop shaft 48*b* does not exceed 20° and contributes to the longitudinal alignment between the front end of rear prop shaft 48*b* and the rear end of rear prop shaft 48*b*. It may be appreciated that the angle of oil pan 68 prevents interference with rear prop shaft 48*b* such that rear prop shaft 48*b* may be positioned adjacent crankcase 58.

As shown in FIGS. 5A-9B, engine 40 is generally positioned rearward of operator area 30 and is positioned rearward of seats 32, 34. Illustratively, engine 40 is positioned generally rearward of passenger seat 34 and is laterally offset from operator seat 32, such that engine 40 is longitudinally aligned with a portion of passenger seat 34. Additionally, engine 40 is positioned longitudinally between rear differential 46 and transmission 42. More particularly, engine 40 is positioned rearward of transmission 42 such that at least a portion of engine 40 and a portion of transmission 42 are longitudinally aligned with each other in the fore/aft direction. Additionally, and as discussed further herein, the angle of prop shaft 48 does not exceed 20° relative to horizontal/ground plane/longitudinal axis L.

Referring still to FIGS. 5A-9B, at least a portion of transmission 42 is positioned forward of cargo area 28. In various embodiments, engine 40 is positioned below cargo area 28, however, in other embodiments, a portion of transmission 42 may extend under a portion of cargo bed surface 29. The height of transmission 42 is lower than that of cargo bed surface 29 such that even if a portion of transmission 42 is positioned directly under cargo area 28, transmission 42 does not interfere with cargo bed surface 29.

In the illustrative embodiment, transmission 42 is positioned generally to the right of longitudinal axis L such that a portion of transmission 42 longitudinally overlaps (e.g., is positioned longitudinally rearward of) passenger seat 34 within operator area 30. Additionally, transmission 42 is generally positioned rearward of operator area 30 and seats 32, 34, although at least a forward extent of transmission 42 may extend into operator area 30 and between seats 32, 34. As such, engine 40 and transmission 42 are generally positioned within an envelope 102 defined between rear ground-engaging members 14 and operator area 30. Envelope 102 also may be defined vertically as extending from approximately axis of rotation $R_2$ to a lower or bottom surface of cargo box 28. In this way, at least engine 40 and transmission 42 are positioned within envelope 102 and, therefore, are below a lower surface of cargo box 28, above axis of rotation $R_2$, laterally between a width defined as the distance between rear ground-engaging members 14, and longitudinally between operator area 30 and rear ground-engaging members 14. If vehicle 10 included additional passenger seats positioned behind seats 32, 34, then transmission 42 may extend into a portion of operator area 30 and may be positioned laterally intermediate various rear passenger seats.

Transmission 42 is closely mounted to engine 40 through mounting surfaces 50, 52 such that engine 40 and transmission 42 abut each other. In particular, the rearward extent of transmission 42 abuts the forward extent of engine 40. This close or compact arrangement between engine 40 and transmission 42 also allows the angle of prop shaft 48 not to exceed 20° relative to horizontal/ground plane/longitudinal axis L.

As shown in FIGS. 5A-9B, output 100 is positioned to the left of longitudinal axis L and aligned with the location of prop shaft 48 such that rear prop shaft 48*b* extends linearly and rearwardly from output 100 and along crankcase 58 of engine 40 while front prop shaft 48*a* extends linearly and forwardly from output 100 and between seats 32, 34. In this way, prop shaft 48 is longitudinally aligned with output 100 which minimizes any angle in prop shaft 48 from output 100 to front and rear differentials 44, 46. If the configuration of powertrain assembly 16 at rear frame portion 38 is different from that shown in FIGS. 4-9B, prop shaft 48 may be angled relative to longitudinal axis L; however, to overcome an angle of prop shaft 48 in such embodiments, a gear-to-gear drive may be used along prop shaft 48 to account for the angled configuration of prop shaft 48 and the rotation.

Figure 7:
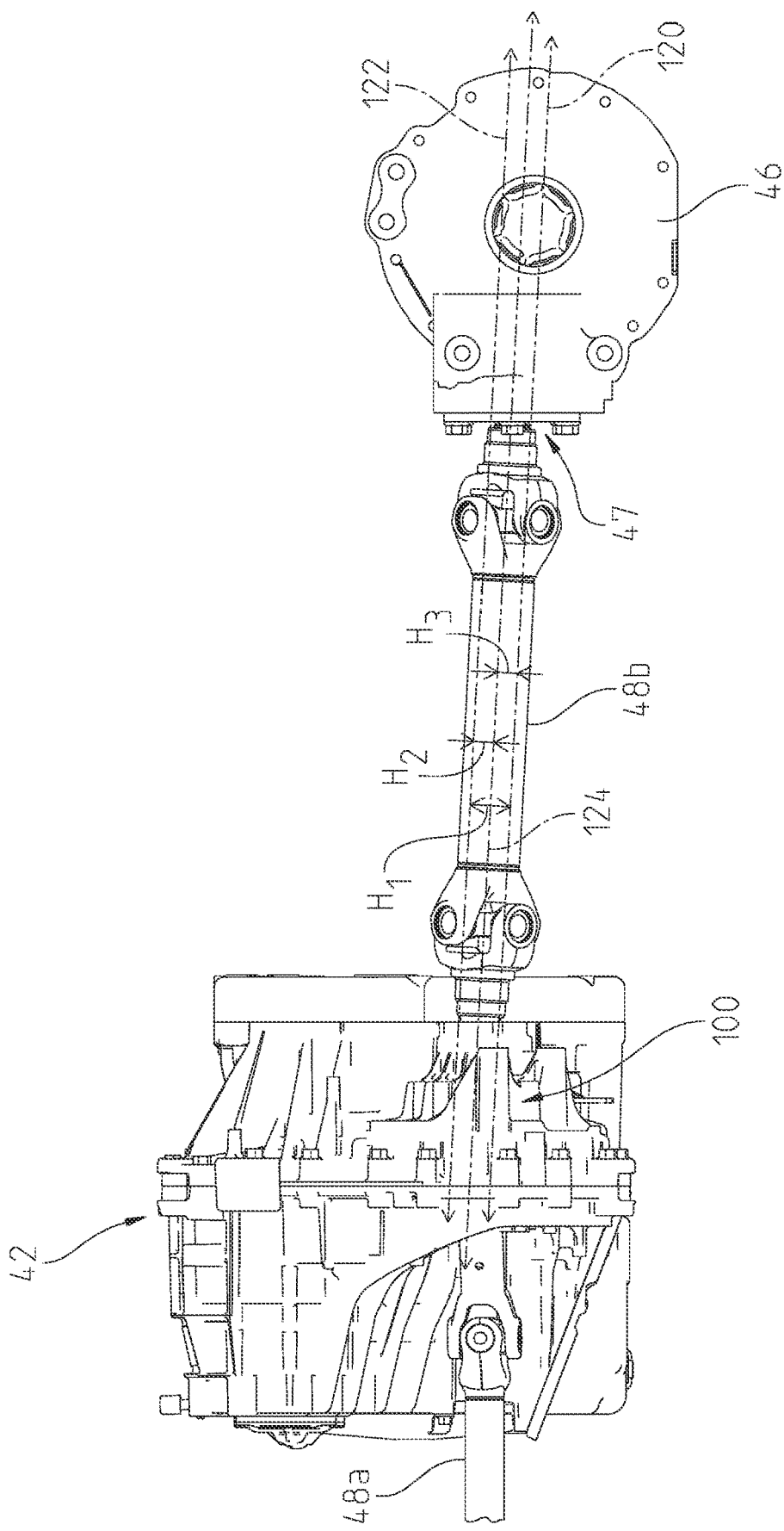
FIG. 7 is a side view of the powertrain assembly of FIG. 5A.
Figure 8:
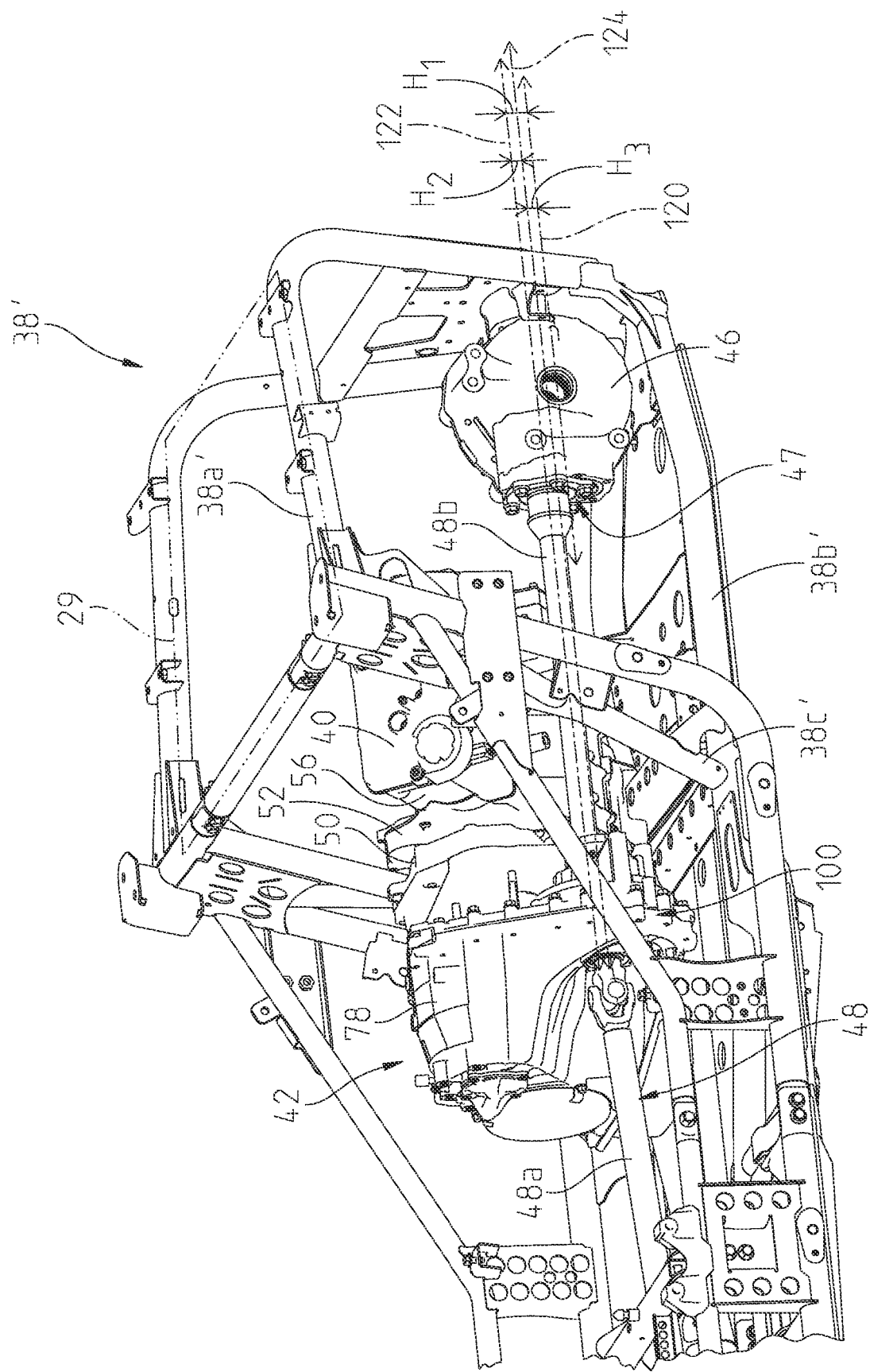
FIG. 8 is a front left perspective view of an alternative embodiment rear frame portion supporting the powertrain assembly of any of FIGS. 3A-4G.
Figure 9A:
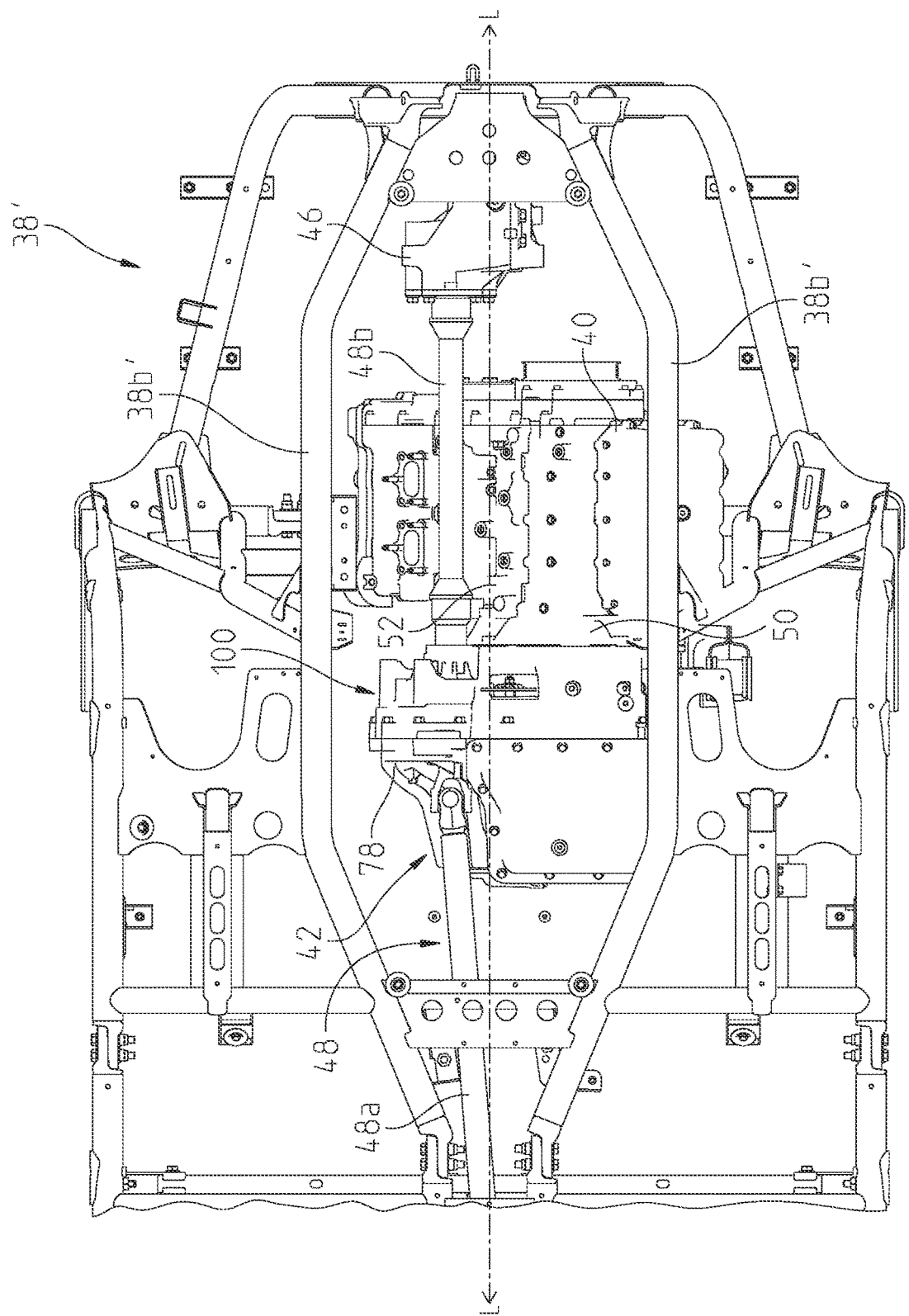
FIG. 9A is a bottom view of the rear frame portion of FIG. 8.
Figure 9B:
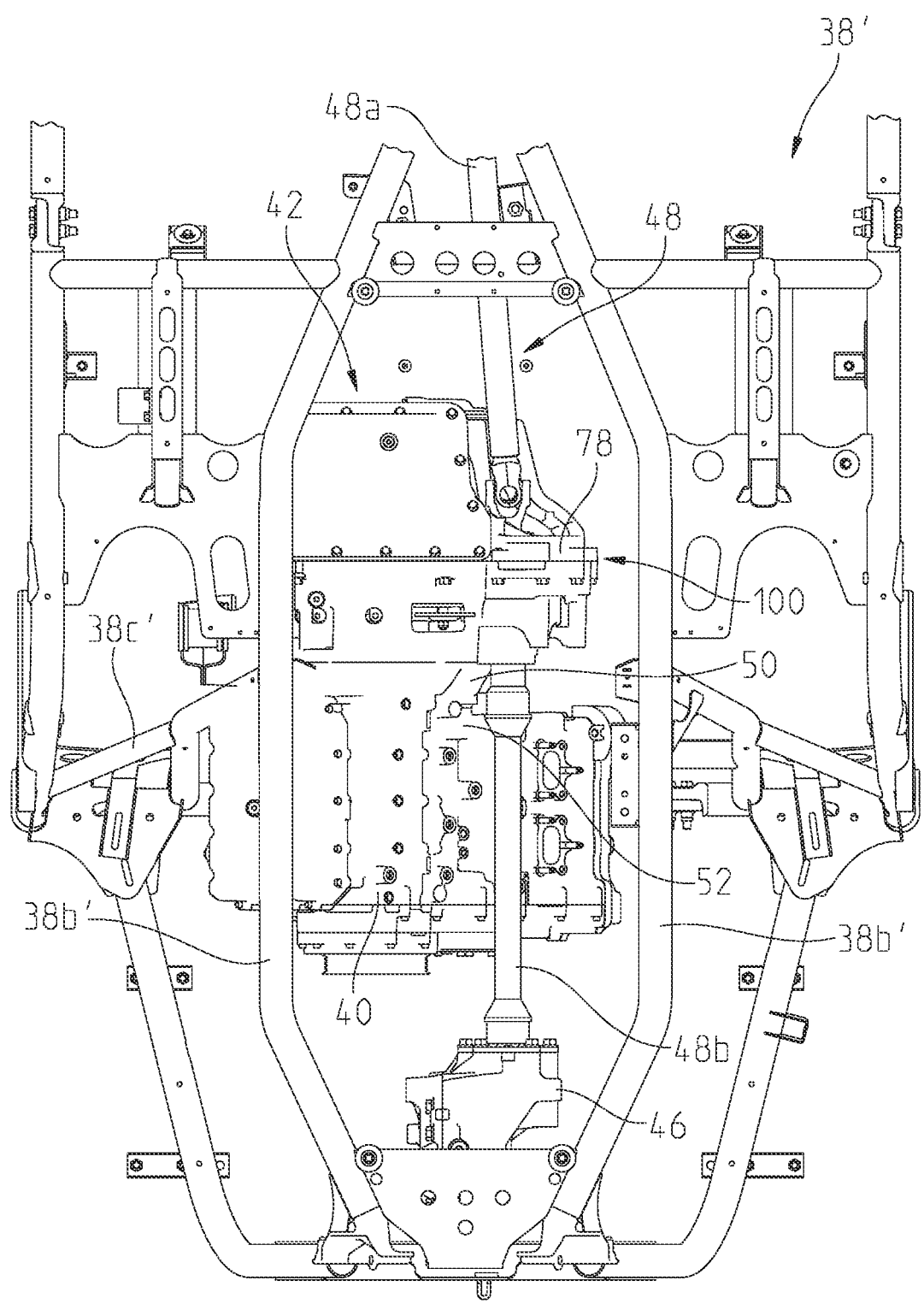
FIG. 9B is a further bottom view of the rear frame portion of FIG. 8.

Referring to the embodiment of FIG. 7, with respect to the compact packaging of rear differential 46, engine 40, and transmission 42, the output of engine 40 (e.g., crankshaft 60) (FIG. 10) extending along an output centerline/horizontal axis 124, output 100 of transmission 42 extending along an output centerline/horizontal axis 122, and an input 47 of rear differential 46 extending along an input centerline/horizontal axis 122 all may be at approximately the same height along a horizontal axis. Because rear prop shaft 48*b* is in a generally linear orientation with respect to horizontal and longitudinal axis L, noise and vibration in powertrain assembly 16 is reduced. In one embodiment, output 100 of transmission 42 is positioned above a height of input 47 of rear differential 46 (measured as the vertical distance $H_1$ between axes 120 and 122). Additionally, in embodiments, output 100 of transmission 42 is positioned above a height of the output of engine 40 (measured as the vertical distance $H_2$ between axes 122 and 124). Further, in various embodiments, input 47 of rear differential 46 is positioned below a height of the output of engine 40 (measured as the vertical distance $H_3$ between axes 120 and 124).

Alternatively, in one embodiment, as shown in FIG. 3C, rear differential 46 may be configured as a crown, spiral bevel, or hypoid rear drive, where input 47 of rear differential 46 is positioned along the left side of longitudinal axis L. In such a configuration, rear prop shaft 48*b* may be angled relative to output 100 of transmission 42. The angle of rear prop shaft 48*b* may be up to approximately 20° relative to longitudinal axis L and may be angled relative to horizontal.

Front prop shaft 48*a* is generally longitudinally aligned with rear prop shaft 48*b* such that front prop shaft 48*a* also is positioned to the left of longitudinal axis L and is parallel to longitudinal axis L. In one embodiment, front prop shaft 48*a* is positioned closer to operator seat 32 rather than passenger seat 34 and, in one embodiment (e.g., FIG. 6), is vertically aligned with a portion of operator seat 32 such that a portion of operator seat 32 is directly vertically above a portion of front prop shaft 48*a*.

It is noted that the configuration of engine 40 relative to transmission 42 may be adjusted. For example, engine 40 may be configured to face rearwardly and away from transmission 42 and/or may be positioned forward of transmission 42. In such embodiments, to overcome the angle of prop shaft, a gear-to-gear drive may be used along prop shaft 48 to account for the angled configuration of prop shaft 48 and the rotation. Additionally, a single-stage gear set reduction may allow the angle of prop shaft 48 to be fixed when engine 40 is facing the opposite direction from that shown in FIGS. 5A-9.

Figure 4E:
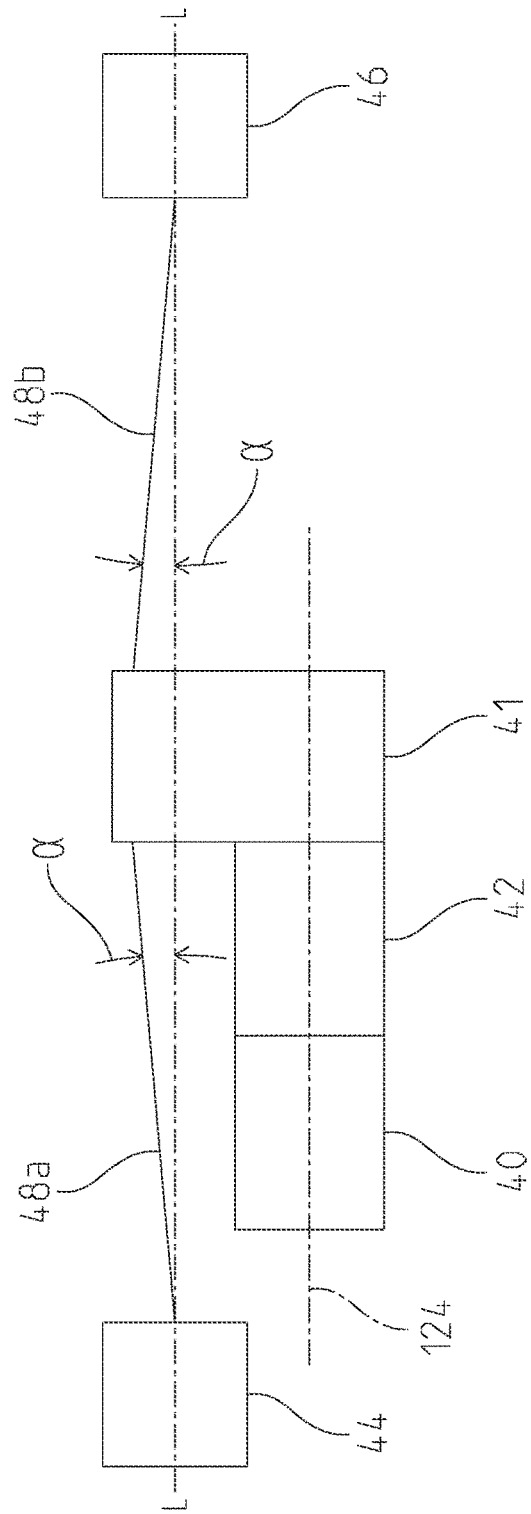
FIG. 4E is a top view of the powertrain assembly of FIG. 4A including a transfer case operably coupled to the transmission.

More particularly, embodiments of powertrain assembly 16 with engine 40 positioned forwardly of transmission 42 are shown in FIGS. 4A-4F. As noted herein, various aspects of powertrain assembly 16 shown in FIGS. 3A-3I and 5A-14B may be applicable the embodiments of FIGS. 4A-4F. Referring to FIG. 4A, engine 40 may be positioned forwardly of transmission 42 such that a rear extent of engine 40 is coupled with a forward extent of transmission 42. In this embodiment, prop shaft 48 may be angled (angle $\alpha$) laterally up to 20° relative to longitudinal axis L. Illustratively, both front and rear prop shafts 48a, 48b are angled to the right of longitudinal axis, however, front and/or rear prop shaft 48a, 48b may be angled to either the right or left of longitudinal axis L.

Referring to FIG. 4B, when engine 40 is positioned forwardly of transmission 42, prop shaft 48 also may be angled (angle $\alpha$) vertically up to 20° relative to the line horizontal to the ground plane. Illustratively, both front and rear prop shafts 48a, 48b are angled vertically upward relative to the line horizontal to the ground plane in order to couple with transmission 42; however, it may be appreciated that front and/or rear prop shafts 48a, 48b may be angled vertically upward or downward relative to the line horizontal to the ground plane.

In the embodiment of FIGS. 4A and 4B, in which engine 40 is positioned forward of transmission 42, when looking at the front view of FIG. 4C, it is apparent that front prop shaft 48a rotates in a clockwise direction for forward motion of vehicle 10. It is also apparent that centerline of engine power output 124 is seemingly positioned to the right side of longitudinal axis L, although centerline of engine power output 124 is positioned along a left or driver side of vehicle 10. Additionally, as shown in the rear view of FIG. 4D, when engine 40 is positioned forward of transmission 42, rear prop shaft 48b rotates in a counterclockwise direction for forward motion of vehicle 10 and centerline of engine power output 124 is positioned to the left side of longitudinal axis L.

In one embodiment, powertrain assembly 16 of FIGS. 4A-4D may include transfer case 41 operably coupled to transmission 42, as shown in FIG. 4E. Both front and rear prop shafts 48a, 48b may be angled (angle $\alpha$) laterally up to 20° relative to longitudinal axis L to operably couple with transfer case 41. Illustratively, both front and rear prop shafts 48a, 48b are angled laterally to the right of longitudinal axis L, however, it may be appreciated that front and rear prop shaft 48a, 48b may be angled laterally to the right or left of longitudinal axis L.

Figure 4F:
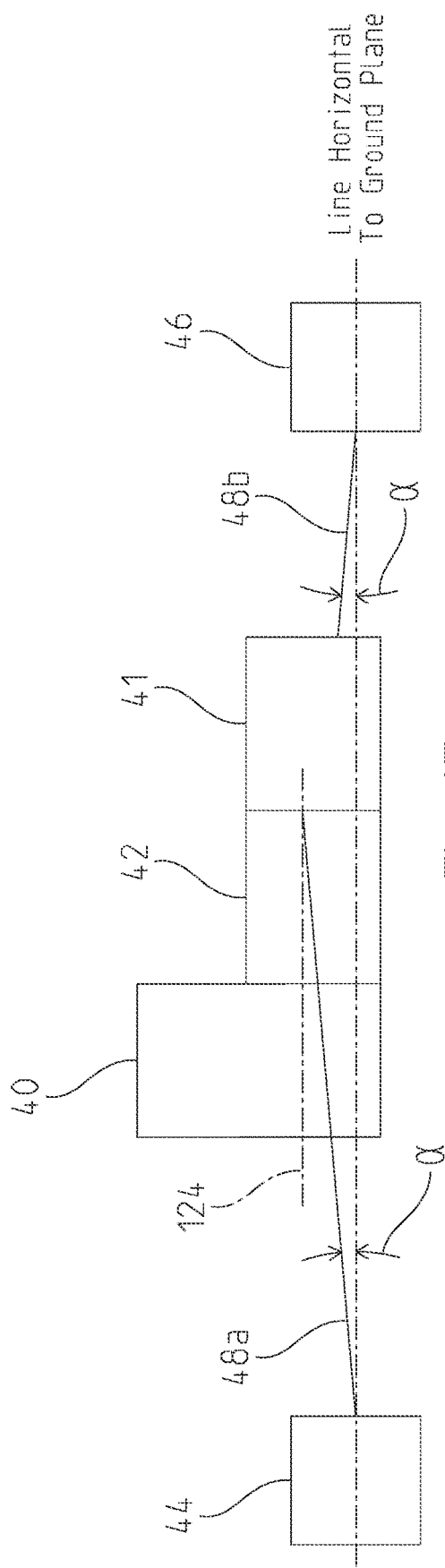
FIG. 4F is a left side of the powertrain assembly of FIG. 4E.
Figure 5A:
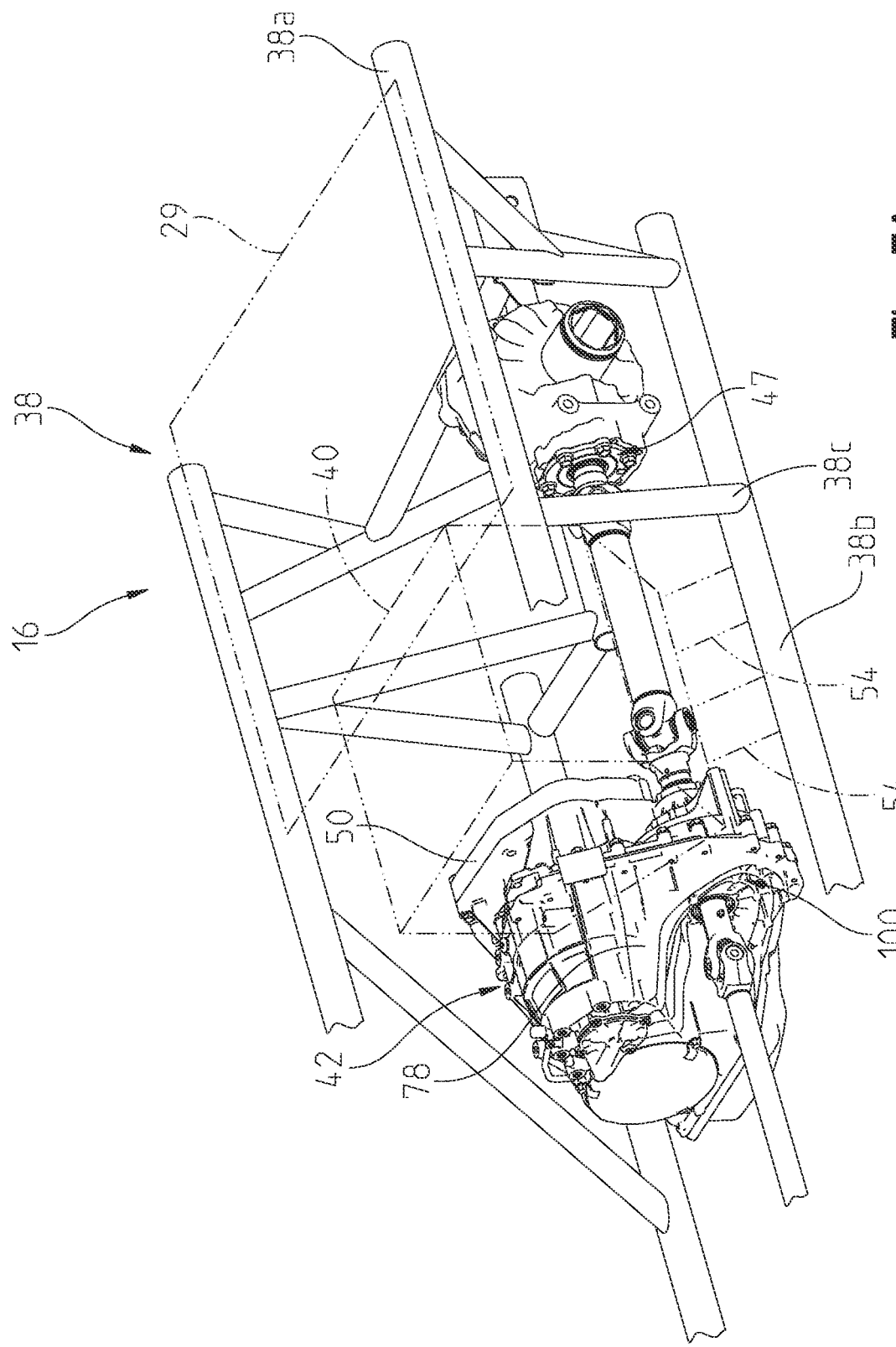
FIG. 5A is a front left perspective view of a rear frame portion supporting the powertrain assembly of any of FIGS. 3A-4G.
Figure 5B:
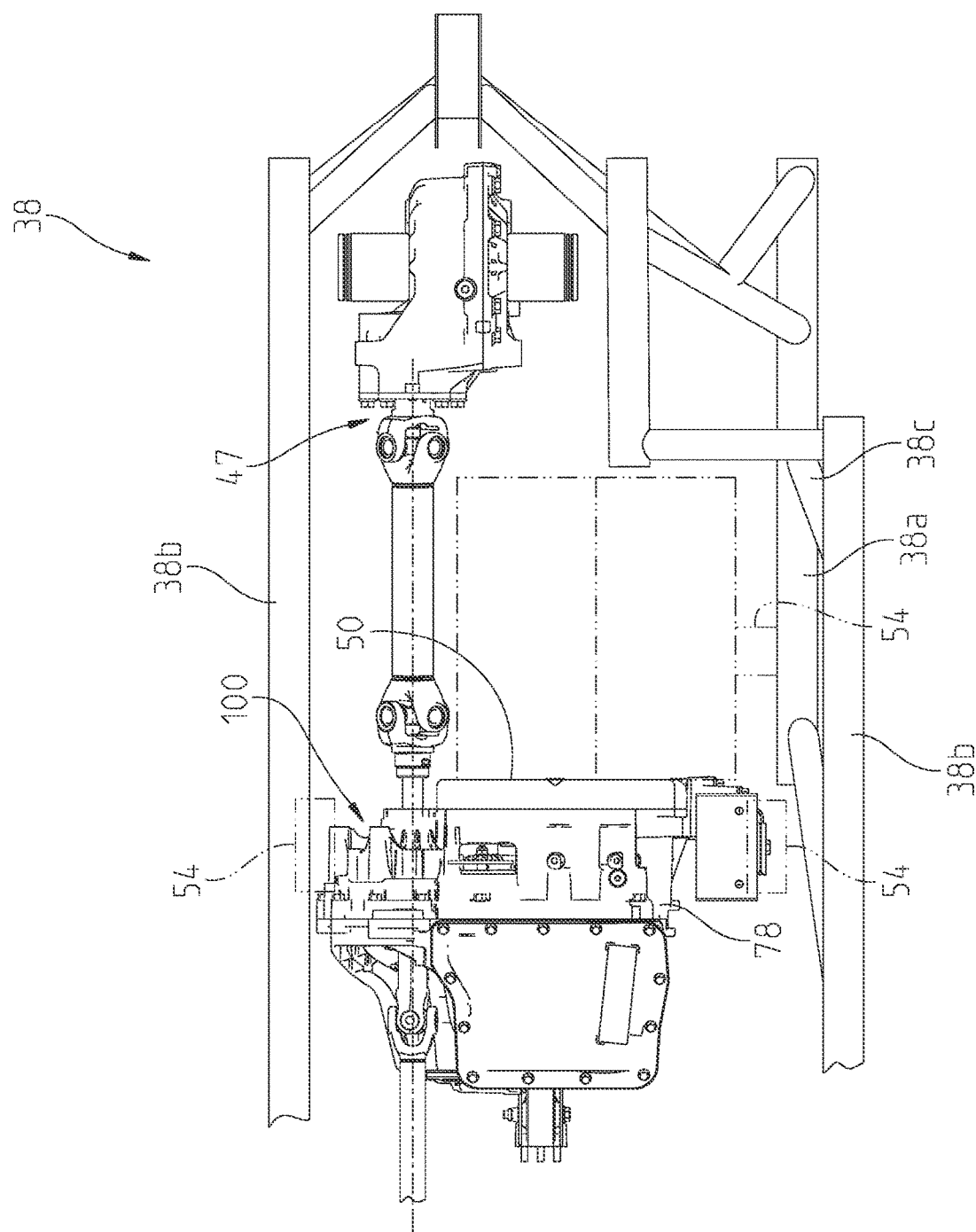
FIG. 5B is a bottom view of the rear frame portion and the powertrain assembly of FIG. 5A.
Figure 6:
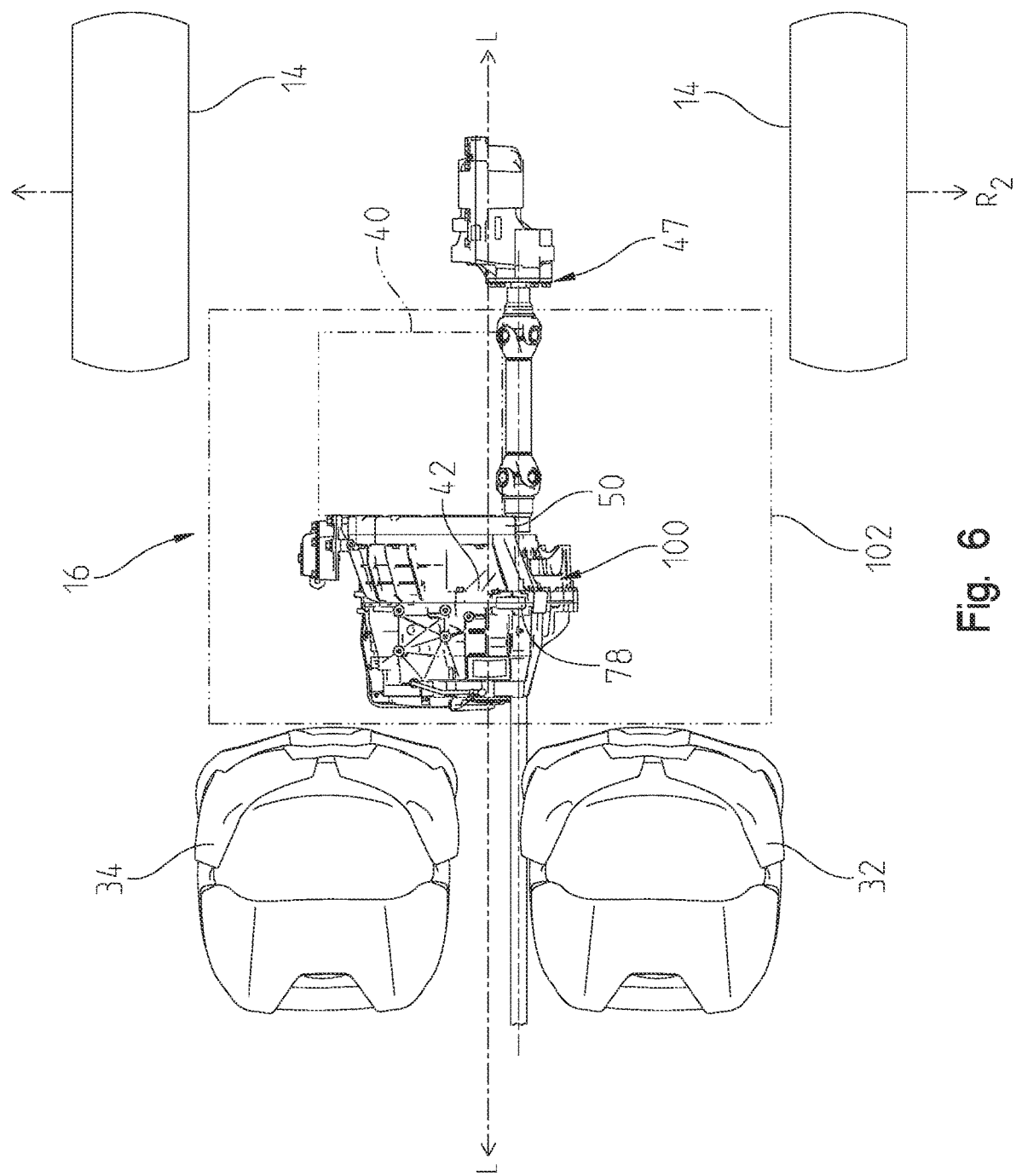
FIG. 6 is a top view of the powertrain assembly of FIG. 5A relative to seats within an operator area of the vehicle of FIG. 1.

Additionally, as shown in FIG. 4F, when powertrain assembly 16 includes transfer case 41 and engine 40 is positioned forward of transmission 42, both front and rear prop shafts 48a, 48b may be angled vertically (angle $\alpha$) up to 20° relative to the line horizontal to the ground plane. Illustratively, front and rear prop shafts 48a, 48b are angled vertically above the line horizontal to the ground plane by angle $\alpha$; however, it may be appreciated that front and rear prop shafts 48a, 48b may be angled vertically downward relative to the line horizontal to the ground plane.

A further alternative embodiment is shown in FIG. 4G in which rear differential is integrated into transmission 42. In this way, rear prop shaft 48b is eliminated because the rear axles extend laterally outward from housing 78 of transmission 42 to couple with rear ground-engaging members 14. Therefore, in such a configuration, engine 40 is positioned forward of transmission 42, transmission 42 may be a steel belt transmission as disclosed herein, rear differential 46 is integrated into transmission 42, and only a single prop shaft 48 extends forwardly from transmission 42 to couple with front differential 44.

Angle $\alpha$ is used herein to describe the angle of front and rear prop shafts 48a, 48b relative to longitudinal axis L and the line horizontal to the ground plane, however, it is to be appreciated that the use of angle $\alpha$ herein does not denote that front and rear prop shafts 48a, 48b have the same angle as each other relative to longitudinal axis L and/or the line horizontal to the ground plane. Nor does the use of angle $\alpha$ denote that front or rear prop shafts 48a, 48b have the same angle relative to longitudinal axis L as the angle relative to the line horizontal to the ground plane.

Additionally, while various embodiments disclosed herein show engine 40 and transmission 42 in longitudinal alignment with each other, other embodiments may include engine 40 and transmission 42 in lateral alignment with portions of each other. In such a configuration, mounting surfaces 50, 52 may face towards the right and left sides of vehicle 10, rather than in the fore and aft directions of vehicle 10 as shown in FIGS. 5A-9B. Engine 40 may be positioned along or on the first or right side of longitudinal axis L while transmission 42 may be positioned on the second or left side of longitudinal axis L.

Figure 15:
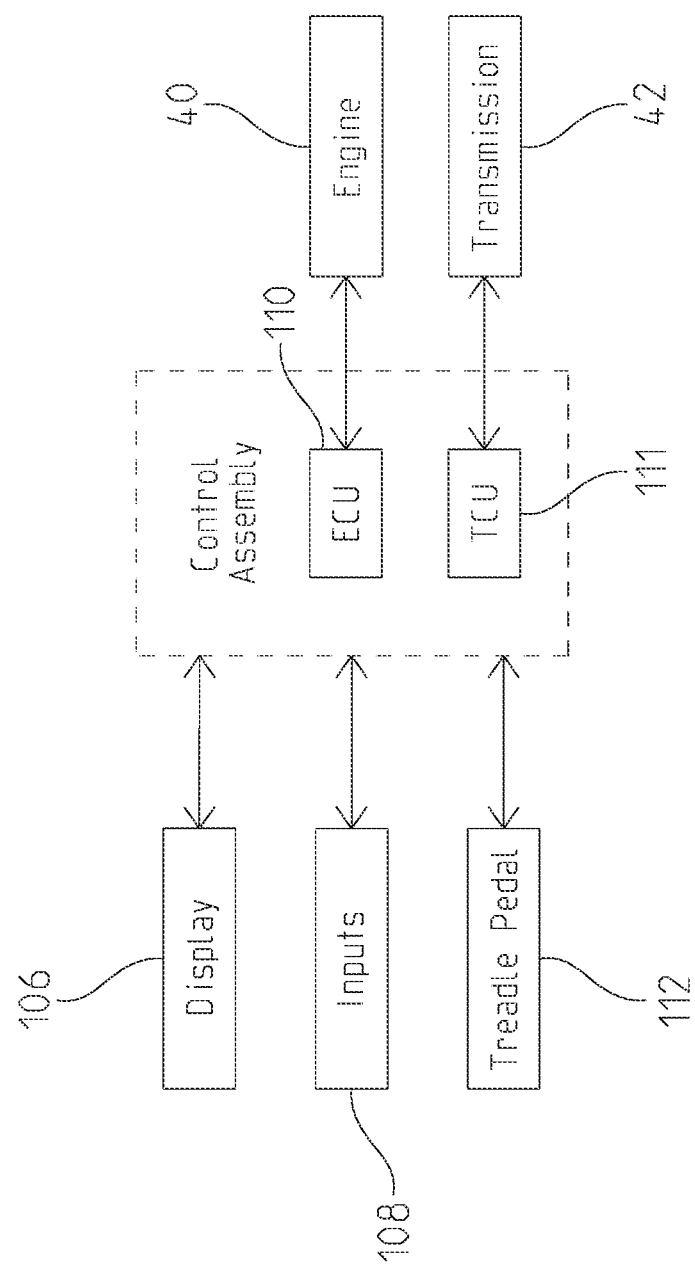
FIG. 15 is a schematic view of a control assembly or system of the vehicle of FIG. 1.

During operation of vehicle 10, and irrespective of whether powertrain assembly 16 of FIGS. 3A-3I or powertrain assembly 16 of FIGS. 4A-4F are used, the operator may be able to make various selections or inputs to control operation of vehicle 10. For example, and as shown best in FIG. 2, operator area 30 includes a dashboard assembly 104 which supports a gauge or display 106 and a plurality of inputs 108. Inputs 108 may be any type of mechanical lever, button, knob, switch, or the like configured to receive an input command or inputs 108 may be received through display 106, which may be configured as a touchscreen display and configured to provide information to the operator and receive input commands. Display 106 and inputs 108 may be electronically coupled to a control assembly comprising an engine control unit ("ECU") 110 for monitoring and controlling operation of at least engine 40 and a transmission control unit ("TCU") 111 for monitoring and controlling operation of transmission 42, as shown in FIG. 15.

Certain inputs 108 may define operating or drive mode controls which allow at least one component of powertrain assembly 16 to operate according to certain parameters. Various components of the control assembly, inputs 108, display 106, engine 40, and/or transmission 42 may all communicate over CAN communication. As disclosed herein, powertrain assembly 16 may operate in at least any of the following modes, with additional operating modes being available, and noting that rear prop shaft 48b may be disconnected from rear differential 46 or the front prop shaft 48a may be disconnected from front differential 44 (e.g., for 2WD instead of AWD) where necessary to operate in any of these modes:

Cruise Mode

When the operator desires to operate vehicle 10 in a cruise mode, the operator may select the cruise mode through inputs 108, which triggers ECU 110 and/or TCU 111 to communicate with at least engine 40 and/or transmission 42, respectively. In the cruise mode, the speed (e.g., RPM) of engine 40 is decreased while maintaining the desired speed the operator wishes vehicle 10 to travel at while in the cruise mode. In particular, the gear ratio of transmission 42, including differential 43, may be adjusted to maintain the selected speed from the operator while decreasing engine speed. In one embodiment, ECU 110 calculates a virtual accelerator pedal position necessary to hold or maintain the desired speed selected by the operator and transmission 42 reacts to the virtual pedal position accordingly.

Fuel Economy Mode

When the operator desires to maximize the fuel range of vehicle 10, the operator may select the fuel economy mode through inputs 108, which triggers ECU 110 and/or TCU 111 to communicate with at least engine 40 and/or transmission 42, respectively. In the fuel economy mode, ECU 110 determines the most efficient part or portion of the engine map at a given condition and controls operation of engine 40 accordingly. More particularly, transmission 42 may be maintained in a higher gear ratio for improved fuel economy.

Plow Mode

When the operator desires to operate an accessory of vehicle 10, such as a snow plow, winch, or other similar device, the operator may select the plow mode through inputs 108, which triggers ECU 110 and/or TCU 111 to communicate with at least engine 40 and/or transmission 42, respectively. In one embodiment, while vehicle 10 operates in the plow mode, the control assembly may communicate with a treadle pedal 112 (FIG. 15) or other similar input and powertrain assembly 16 to provide sufficient power to operate the accessory (e.g., raise and lower the plow).

Tow Mode

When the operator desires to tow a trailer or other item (e.g., a vehicle), the operator may select the tow mode through inputs 108, which triggers ECU 110 and/or TCU 111 to communicate with at least engine 40 and/or transmission 42, respectively. In the tow mode, TCU 111 may communicate with transmission 42 to lock the ratio of transmission 42 while ECU 110 may communicate with engine 40 to vary the engine speed (e.g., RPM). The tow mode also may be used in rock crawling situations.

Creep Mode

When vehicle 10 is able to creep forward upon releasing the brake (e.g., lifting the operator's foot off of the brake triggers vehicle 10 to slowly move forward), ECU 110 and/or TCU 111 communicates with at least engine 40 and/or transmission 42, respectively. In the creep mode, TCU 111 may communicate with transmission 42 to keep the clutch plates a specified distance from each other such that, when the operator lifts his/her foot off of the brake pedal, vehicle 10 is able to creep forward. In operation, the brake and accelerator pedals are not used and, instead, a load may be applied to engine 40 through the clutch for a steady, low vehicle speed. In the no-creep mode, TCU 111 may communicate with transmission 42 to close the clutch plates towards each other such, when the operator lifts his/her foot off of the brake pedal, vehicle 10 does not creep forward. In one embodiment, the operator may select the creep mode through inputs 108, which communicate the operator's selection to ECU 110 and/or TCU 111.

Shift Mimic Mode

When the operator desires to shift gears manually, the operator may select the shift mimic mode through inputs 108, which triggers ECU 110 and/or TCU 111 to communicate with at least engine 40 and/or transmission 42, respectively. In the shift mimic mode, TCU 111 is in communication with paddle shifters within operator area 30 and receives user-commanded ratio changes to mimic discrete ratio transmission behavior.

Performance Mode

When it is desirable to prioritize and/or optimize performance of vehicle 10 (e.g., increased horsepower, speed, torque, etc.), the operator may select to operate vehicle 10 in the performance mode, which triggers ECU 110 and/or TCU 111 to communicate with at least engine 40 and/or transmission 42, respectively, to control operation and parameters of various aspects of powertrain assembly 16.

Additionally, vehicle 10 may further include additional operating features or controls, such as active descent control ("ADC") and hill-hold control. More particularly, with respect to ADC, transmission 42 may be configured to provide ADC up to a particular operating or terrain threshold. By using transmission 42, engine braking and torque to rear ground-engaging members 14 is controlled. If the operating or terrain conditions exceed the predetermined threshold, then the braking assembly (e.g., an anti-locking braking system ("ABS")) is configured to provide ADC above the predetermined threshold for controlled operation when vehicle 10 is traveling downhill.

In one embodiment, TCU 111 is configured to detect a downhill driving situation based on torque delivered from ground-engaging members 12, 14 to the flywheel/engine 40 (e.g., using wheel speed sensors). When this downhill driving situation is detected, the control system is configured to limit engine braking torque available if an increase in the speed of engine 40 is detected and use engine braking. More particularly, the clutch will apply a load on engine 40 when on a downhill for engine braking and control of downhill speed.

With respect to hill-hold control, transmission 42 may be configured to provide hill-hold control up to a particular operating or terrain threshold. By using transmission 42, engine braking is controlled. If the operating or terrain conditions exceed the predetermined threshold, then the braking assembly (e.g., the ABS) is configured to provide hill-hold control above the predetermined threshold.

During operation of vehicle 10, it is necessary to maintain the temperature of various components of powertrain assembly 16, such as engine 40 and transmission 42. With respect to cooling engine 40, a heat exchanger (e.g., a radiator) is configured to flow air across engine coolant to decrease the temperature thereof. With respect to cooling transmission 42, an oil-air cooling system may be used. Additionally, with respect to transmission 42, a liquid-to-oil cooler may be integrated with the engine oil cooler. This configuration would allow the temperature of the transmission oil to be lower than the temperature of the engine oil. The cooling assemblies for both engine 40 and transmission 42 may include temperature protections such that if the temperature of engine 40 and/or transmission 42 exceeds a predetermined threshold, the operator may receive a warning message via display 106 or another gauge/display, operating parameters may be reduced, or other similar measures may be implemented.

While this invention has been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
 a plurality of ground-engaging members;
 a frame assembly supported on the plurality of ground-engaging members;
 a powertrain assembly supported by the frame assembly and comprising an engine and a transmission operably coupled to the engine;
 a mount directly coupled to the engine and directly coupled to the frame assembly, the mount supporting the engine, and
 a prop shaft operably coupled to the powertrain assembly and at least one of the plurality of ground-engaging members,
 wherein at least a portion of the mount extends vertically beneath at least a portion of the prop shaft.

2. The vehicle of claim 1, wherein the mount supports at least a portion of the prop shaft.

3. The vehicle of claim 1, wherein portion of the mount supports a case surrounding and supporting at least a portion of the prop shaft.

4. The vehicle of claim 3, wherein the case defines a passage into which the prop shaft extends.

5. The vehicle of claim 4, wherein the passage is oriented longitudinally with respect to the vehicle.

6. The vehicle of claim 3, wherein the prop shaft includes a first shaft and a second shaft, wherein the case is configured to receive the first drive shaft on a first side and the second drive shaft on a second side.

7. The vehicle of claim 6, wherein the first and second drive shafts are arranged to transfer torque therebetween.

8. The vehicle of claim 1, wherein a portion of the mount is coupled to the engine.

9. The vehicle of claim 1, wherein the prop shaft is operably coupled to the transmission and wherein the mount supports the engine, transmission, and drive shaft.

10. The vehicle of claim 1, wherein a bottom surface of the engine is lower than a top-most point of the prop shaft when supported by the mount.

11. The vehicle of claim 1, wherein the mount is coupled to a left side of the engine.

12. A vehicle, comprising:
 a plurality of ground-engaging members;
 a frame assembly supported on the plurality of ground-engaging members;
 a powertrain assembly supported by the frame assembly and comprising an engine and a transmission operably coupled to the engine;
 a mount member supporting a case, the mount member directly coupled to the engine and directly coupled to the frame assembly, wherein the mount extends vertically between the frame assembly and the engine;
 a prop shaft operably coupled to the powertrain assembly and at least one of the plurality of ground-engaging members,
 wherein the case supports at least a portion of the prop shaft.

13. The vehicle of claim 12, wherein the case surrounds at least a portion of the prop shaft.

14. The vehicle of claim 13, wherein the case defines a passage into which the prop shaft extends.

15. The vehicle of claim 14, wherein the passage is oriented longitudinally with respect to the vehicle.

16. The vehicle of claim 13, wherein the prop shaft includes a first shaft and a second shaft, wherein the case is configured to receive the first drive shaft on a first side and the second drive shaft on a second side.

17. The vehicle of claim 16, wherein the first and second drive shafts are arranged to transfer torque therebetween.

18. The vehicle of claim 12, wherein a portion of the mount is coupled to the transmission.

19. The vehicle of claim 12, wherein the case extends from the mount.

20. The vehicle of claim 12, wherein a bottom surface of the engine is lower than a top-most point of the prop shaft when supported by the mount.

* * * * *